G. A. JULIUS.
TOTALIZATOR.
APPLICATION FILED AUG. 9, 1915.

1,280,754.

Patented Oct. 8, 1918.
24 SHEETS—SHEET 1.

INVENTOR:
GEORGE ALFRED JULIUS
BY Albert H. Baker
ATT'Y

G. A. JULIUS.
TOTALIZATOR.
APPLICATION FILED AUG. 9, 1915.

1,280,754.

Patented Oct. 8, 1918.
24 SHEETS—SHEET 2.

INVENTOR:
GEORGE ALFRED JULIUS
BY Albert H. Baker
ATT'Y

G. A. JULIUS.
TOTALIZATOR.
APPLICATION FILED AUG. 9, 1915.

1,280,754.

Patented Oct. 8, 1918.
24 SHEETS—SHEET 4.

INVENTOR:
GEORGE ALFRED JULIUS

BY Albert H. Baker.
ATT'Y

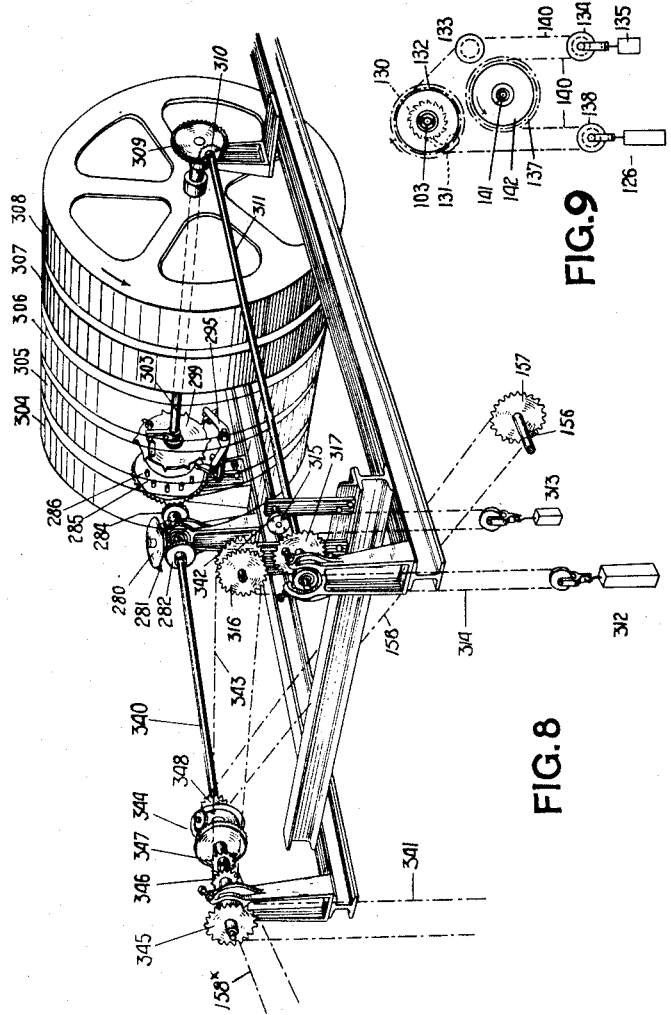

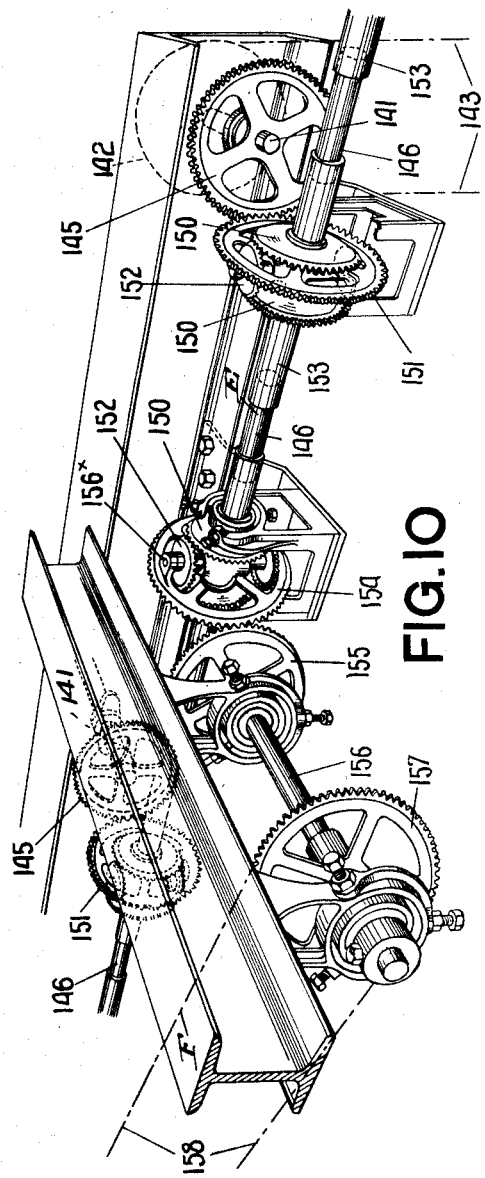

G. A. JULIUS.
TOTALIZATOR.
APPLICATION FILED AUG. 9, 1915.

1,280,754.

Patented Oct. 8, 1918.
24 SHEETS—SHEET 8.

INVENTOR.
GEORGE ALFRED JULIUS

BY Albert H. Baker,

ATT'Y

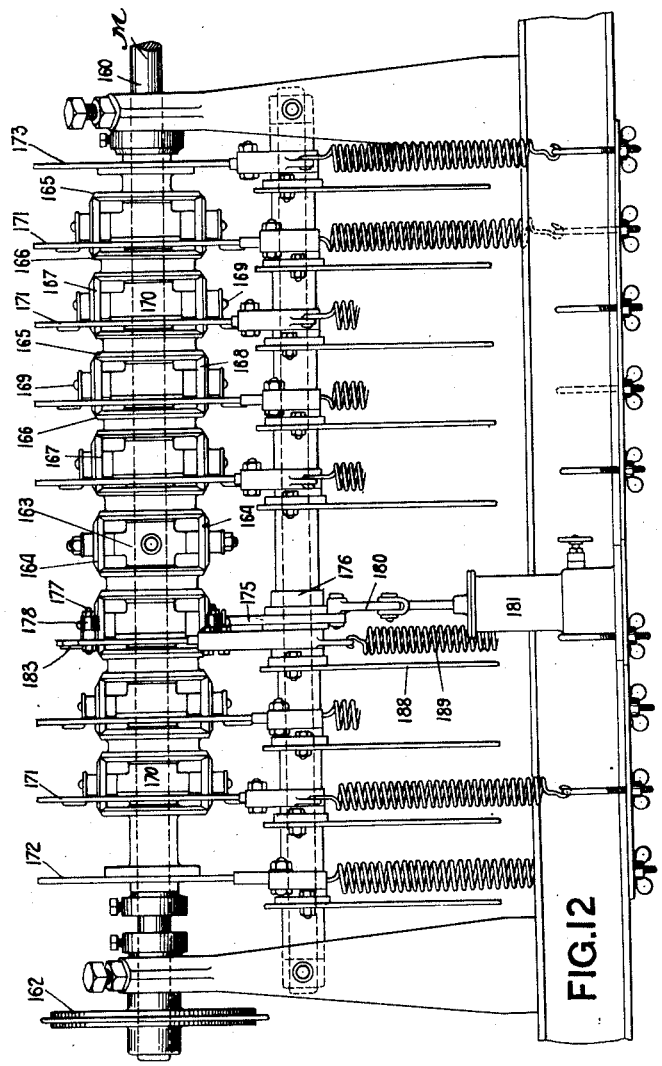

G. A. JULIUS.
TOTALIZATOR.
APPLICATION FILED AUG. 9, 1915.
1,280,754.
Patented Oct. 8, 1918.
24 SHEETS—SHEET 10.
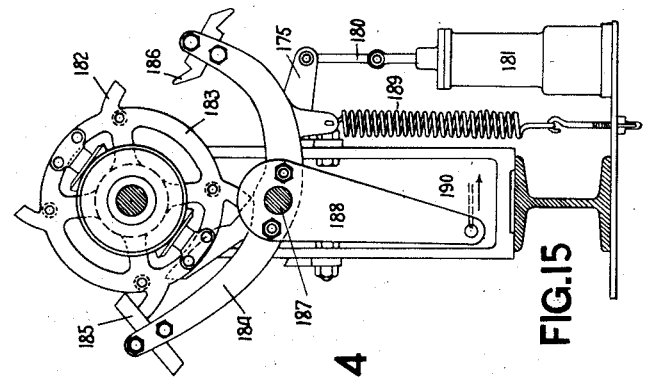
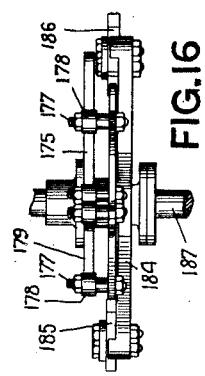
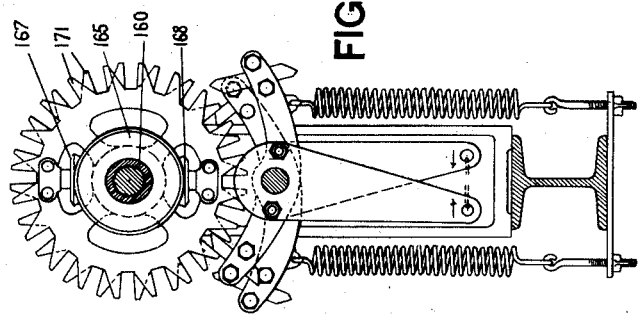
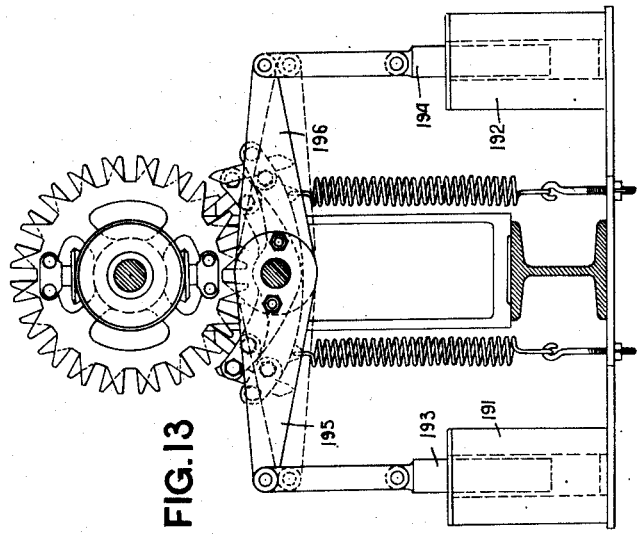
INVENTOR:
GEORGE ALFRED JULIUS
BY Albert H. Bates,
ATT'Y

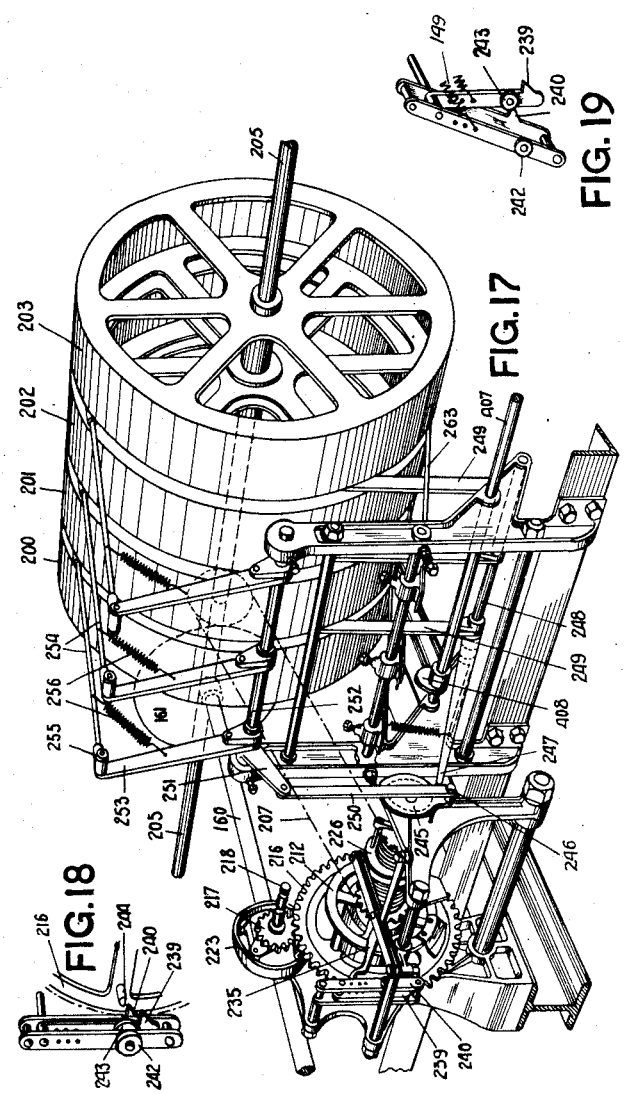

G. A. JULIUS.
TOTALIZATOR.
APPLICATION FILED AUG. 9, 1915.

1,280,754.

Patented Oct. 8, 1918.
24 SHEETS—SHEET 12.

INVENTOR
GEORGE ALFRED JULIUS

BY Albert H. Bates
ATTY

G. A. JULIUS.
TOTALIZATOR.
APPLICATION FILED AUG. 9, 1915.
1,280,754.
Patented Oct. 8, 1918.
24 SHEETS—SHEET 13.
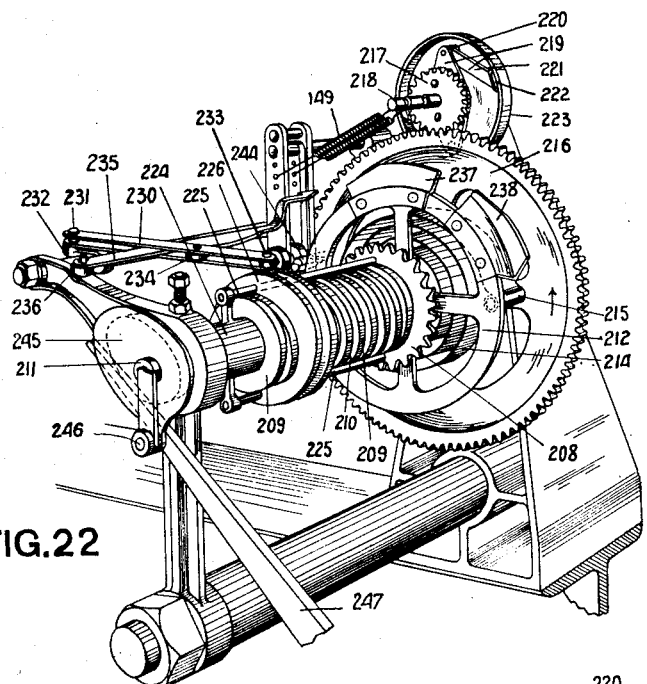
FIG. 22
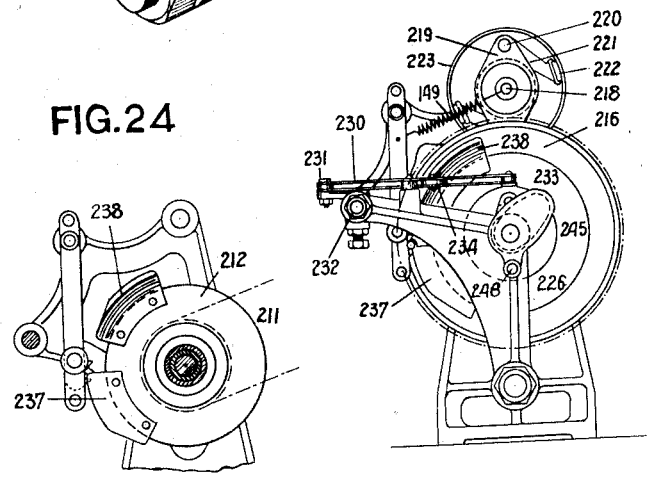
FIG. 24
FIG. 23
INVENTOR
GEORGE ALFRED JULIUS
BY Albert H. Baker
ATT'Y

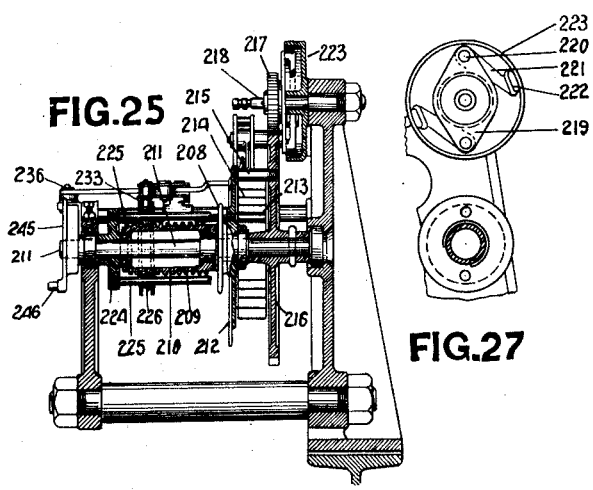
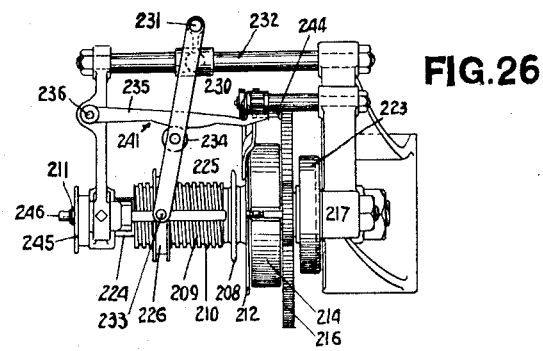

G. A. JULIUS.
TOTALIZATOR.
APPLICATION FILED AUG. 9, 1915.

1,280,754.

Patented Oct. 8, 1918.
24 SHEETS—SHEET 15.

INVENTOR
GEORGE ALFRED JULIUS
BY Albert H. Baker
ATT'Y

G. A. JULIUS.
TOTALIZATOR.
APPLICATION FILED AUG. 9, 1915.

1,280,754.

Patented Oct. 8, 1918.
24 SHEETS—SHEET 16.

INVENTOR:
GEORGE ALFRED JULIUS
BY Albert N. Baker
ATT'Y

G. A. JULIUS.
TOTALIZATOR.
APPLICATION FILED AUG. 9, 1915.

1,280,754.

Patented Oct. 8, 1918.
24 SHEETS—SHEET 17.

INVENTOR:
GEORGE ALFRED JULIUS
BY Albert H. Baker,
ATT'Y

G. A. JULIUS.
TOTALIZATOR.
APPLICATION FILED AUG. 9, 1915.

1,280,754.

Patented Oct. 8, 1918.
24 SHEETS—SHEET 19.

INVENTOR
GEORGE ALFRED JULIUS
BY Albert H. Baker,
ATT'Y

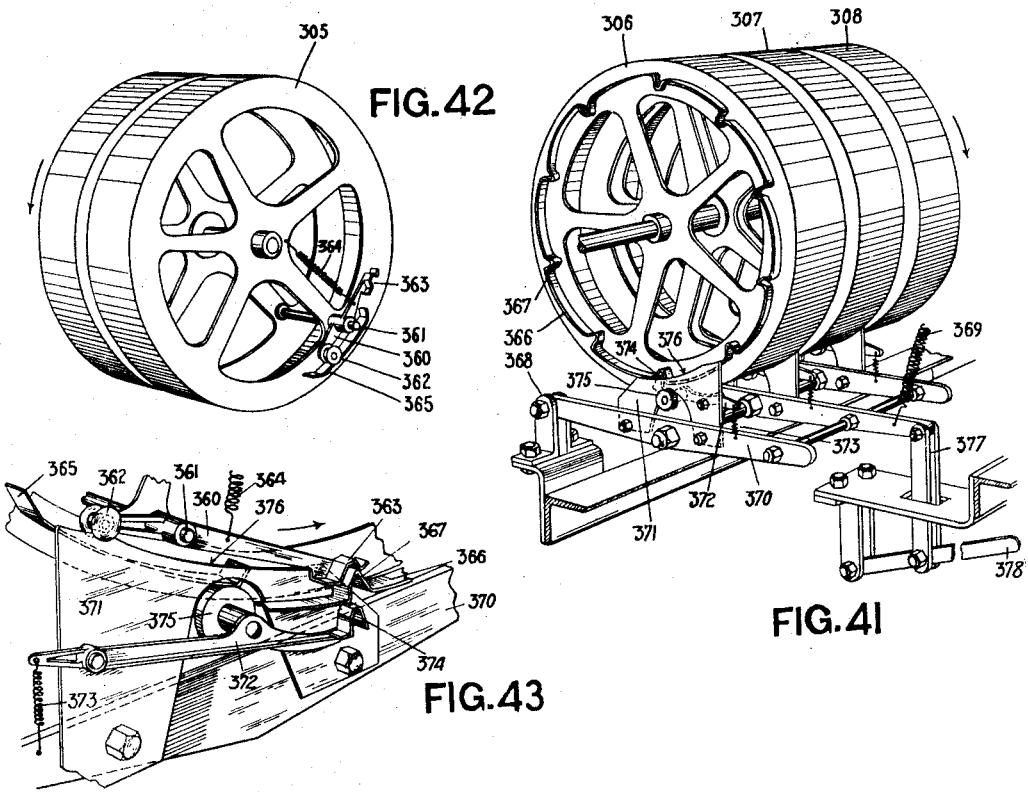

G. A. JULIUS.
TOTALIZATOR.
APPLICATION FILED AUG. 9, 1915.

1,280,754.

Patented Oct. 8, 1918.
24 SHEETS—SHEET 23.

INVENTOR:
GEORGE ALFRED JULIUS
BY Albert H. Bates,
ATT'Y

G. A. JULIUS.
TOTALIZATOR.
APPLICATION FILED AUG. 9, 1915.

1,280,754.

Patented Oct. 8, 1918.
24 SHEETS—SHEET 24.

INVENTOR:
GEORGE ALFRED JULIUS
BY Albert N. Oaks,
ATT'Y

UNITED STATES PATENT OFFICE.

GEORGE ALFRED JULIUS, OF SYDNEY, NEW SOUTH WALES, AUSTRALIA.

TOTALIZATOR.

1,280,754.  Specification of Letters Patent.  Patented Oct. 8, 1918.

Application filed August 9, 1915. Serial No. 44,524.

*To all whom it may concern:*

Be it known that I, GEORGE ALFRED JULIUS, subject of the King of Great Britain and Ireland, residing at Culwulla Chambers, Castlereagh street, Sydney, New South Wales, Australia, have invented certain new and useful Improvements in Totalizators, of which the following is a specification.

This invention relates to totalizator apparatus adapted to be actuated by movements transmitted to it from ticket-issuing mechanism, and it relates in particular to totalizators in connection with which tickets are issued at two or more prices on each "horse" and in which the values of tickets issued, and not merely the number of tickets issued, are indicated in the horse or group totals and in the grand totals.

In existing totalizator apparatus more or less difficulty is experienced in insuring synchronous operation of the group and grand total summing and indicating mechanisms with each other, and with the ticket-issuing mechanisms. Complicated apparatus has been proposed heretofore for the purpose of summing the values of tickets of the same order but of different price. Furthermore, an inconvenient amount of manual attention is required in the operation of known totalizator machines, and mechanical difficulties have arisen owing to the rapidity and irregularity of the movements which must be transmitted through the system, and difficulties have also arisen on account of inertia and momentum of the moving parts. My invention aims at the simplification and substantially automatic operation of totalizator apparatus, and the provision of means whereby mechanical power is applied automatically to each operative element separately, wherein uniform operation of each part of the apparatus is insured notwithstanding abnormal rapidity or irregularity of movements of any other parts; and it aims also at the provision of improved mechanical devices to enable the computation on a single shaft operating an indicator, of the correct money total of a variety of values, so that the indicator operated by such shaft correctly shows the total of the values notwithstanding that the computing mechanism is receiving movements simultaneously from two or more issuing elements, each such individual movement representing a different value.

Certain operative parts are omitted from various figures for the sake of clearness, but are shown in other figures.

Figure 1 is a diagrammatic plan-elevation which indicates the mechanical relation of the elements of the machine which are separately detailed in Fig. 2, which is a skeleton diagrammatic perspective view serving the same purpose as Fig. 1, and showing the several elements in their consecutive relationships.

The elements of the construction are indicated by reference letters in Figs. 1 and 2, but the structural parts are indicated by reference numbers throughout this specification and in all the other figures. In this specification, therefore, wherever any part is referred to by a reference letter, Figs. 1 and 2 should be referred to.

Fig. 3 is a perspective view of the weight driving mechanism which is located at A and B. One of these weight-driving mechanisms is provided for each separate totaling and indicating element. Thus, in a machine containing twenty group totalers and one grand totaler, twenty-one of these weight-drive mechanisms would be provided, and in addition thereto certain auxiliary weight driving mechanisms.

Fig. 8 is a perspective view of the grand totaler and indicator, showing also the weight driving mechanism and chain gears severally connected with the operating and driving shafts of said indicator.

Fig. 9 is a semi-diagrammatic elevation of a rewinding weight rope driving device such as used in a number of places in my mechanism.

Fig. 10 is a perspective view of the summation wheels N on the transfer shaft associated with one of the machine section summation shafts E; it shows also the permissive chain connection F to the final "grand total" collector on shaft G.

Fig. 12 is a side elevational view of a group totaler P in which certain elements are arranged to permit an 18° rotation of the detent wheel, others a 36° rotation thereof, and one element 90° rotation thereof for each movement of the pallet.

Fig. 13 is an end elevational view of an escapement and escapement wheel arranged to be operated electromagnetically.

Fig. 14 is a transverse sectional elevation showing two escapement wheels and escapements and epicyclic gear with which said escapement wheels are associated. The escapement wheels shown in this case are each of twenty teeth, and are capable, therefore, of turning through an angle of 18° at each movement of the associated pallet.

Fig. 15 is a similar view of a four-tooth escapement wheel and its pallet, and shows also a braking mechanism whereby too rapid rotation with consequent objectionable momentum upon the release of the pallet is obviated.

Fig. 16 is a top plan of certain of the parts shown in Fig. 15.

Fig. 17 is a perspective rear side view of a group indicator showing decimal progression mechanism and compensating mechanism by means of which latter, rotations of the shaft M and unit drum at a rate too rapid for operating the indicator decimal progression mechanism are accumulated in the compensator, which operates to deliver the excess rotations of the shaft and unit drum to the decimal progression mechanism at a uniform rate until the tens, hundreds, and thousands drums indicate correct result figures.

Figs. 18 and 19 are perspective views of rocking pawls forming part of the compensator mechanism.

Figure 20:
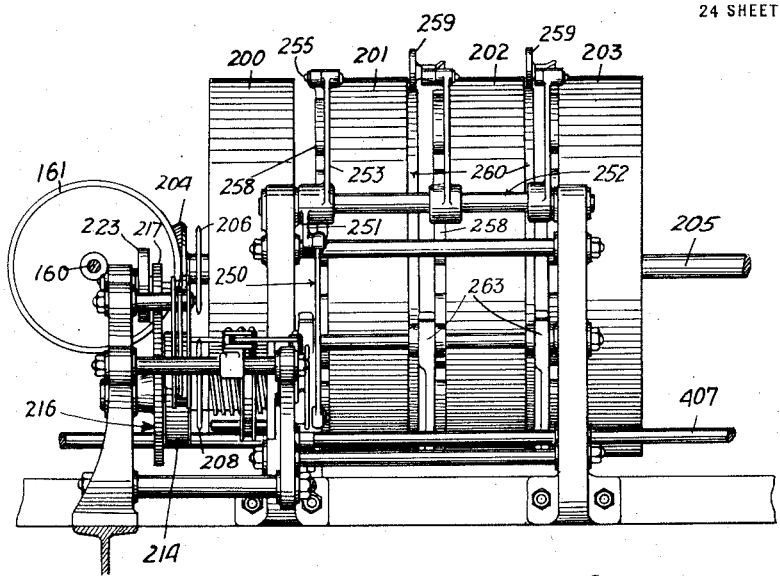

Fig. 20 is a rear side elevation of a group indicator and the decimal progression and overrun compensating mechanism associated with it.

Figure 21:
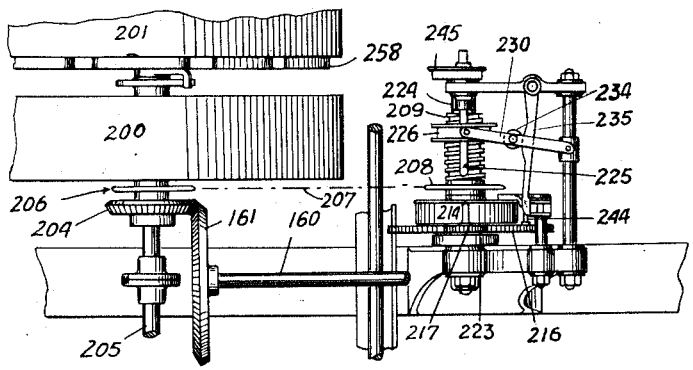

Fig. 21, corresponding incomplete top plan.

Fig. 22, perspective view of overrun compensator.

Fig. 23, end elevation of same.

Fig. 24, fragment elevational view showing the detent wheel in the compensator and the pawls which engage the detents thereon.

Fig. 25, vertical sectional elevation of compensator.

Fig. 26, top plan of same.

Fig. 27, fragment sectional elevational view, illustrating the centrifugal brake associated with the compensator.

Figure 28:
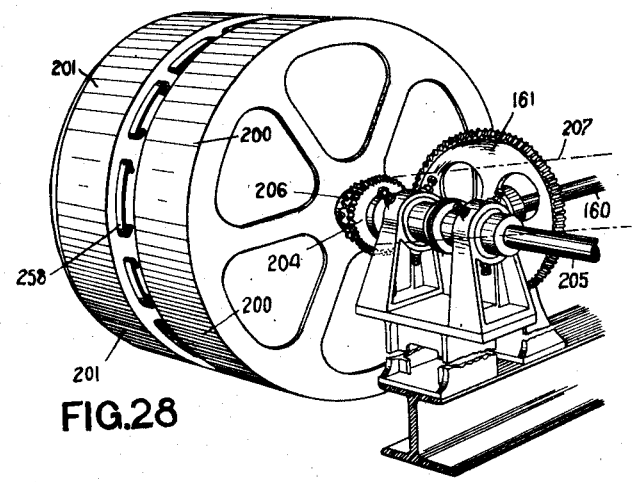

Fig. 28 is an angular perspective view, illustrating the gearing of the computer shaft M to the unit drum of a group indicator, and showing also the sprocket wheel and chain by which motion is communicated back from the unit drum to the overrun compensator.

Figure 29:
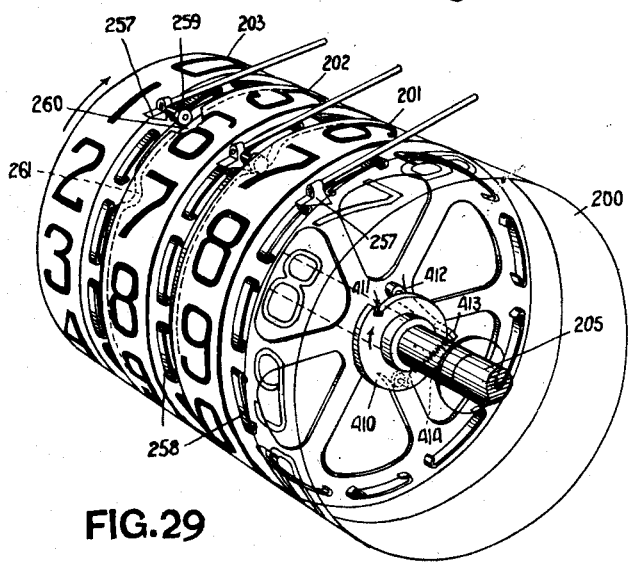

Fig. 29 is a perspective view of a group totaler with the unit drum shown as a phantom. This view exhibits parts of the drum resetting mechanism, and the decimal progression pawls which are actuated through the compensator mechanism, and act upon detent flanges and cam flanges on the side of the tens, hundreds, and thousands drums.

Figure 30:
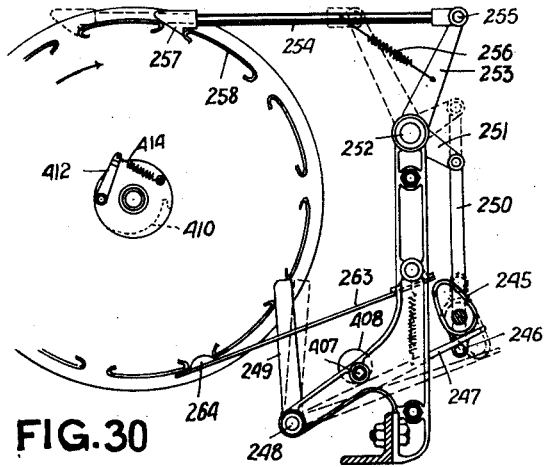

Fig. 30 is an elevational view explanatory of the operation of the decimal progression mechanism and its pawls, and the detent flanges on the sides of the drums and the reverse preventing checks.

Figure 31:
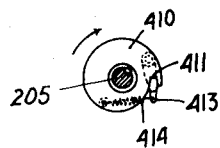

Fig. 31, fragment elevation of the resetting catch gear on the indicator drum shaft, with catch tooth engaged. In Fig. 29 the catch tooth is shown disengaged.)

Figure 32:
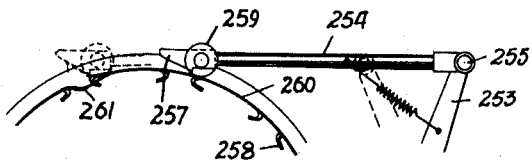

Fig. 32, fragment elevational view explanatory of the constructional means adopted for relieving the hundreds and thousands decimal progression pawls so as to prevent their engagement with the drums higher in series respectively, except when it is necessary to apply decimal progression movement to said drums in their proper decimal order.

Figure 33:
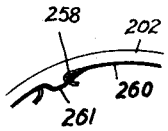

Fig. 33 is a fragment sectional elevation, showing part of the cam flange on one drum, which operates to engage the decimal progression pawl mechanism with the detent flange on the indicator drum next above in series.

Figure 34:
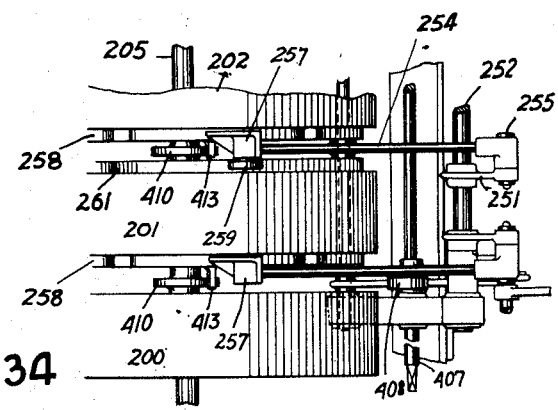

Fig. 34, partial top plan, corresponding with Fig. 30.

Figs. 8 and 9, and 35 to 49, refer to the construction of the grand total mechanism and the parts associated with it. The office of this mechanism is to accumulate the totals of all the group computers and cause the grand total to be displayed simultaneously with the display of group totals, the latter totals being in turn displayed simultaneously with the movements of the issuing mechanism, which movements are mechanically or electrically communicated to the escapement pallets in the group computers.

Figure 35:
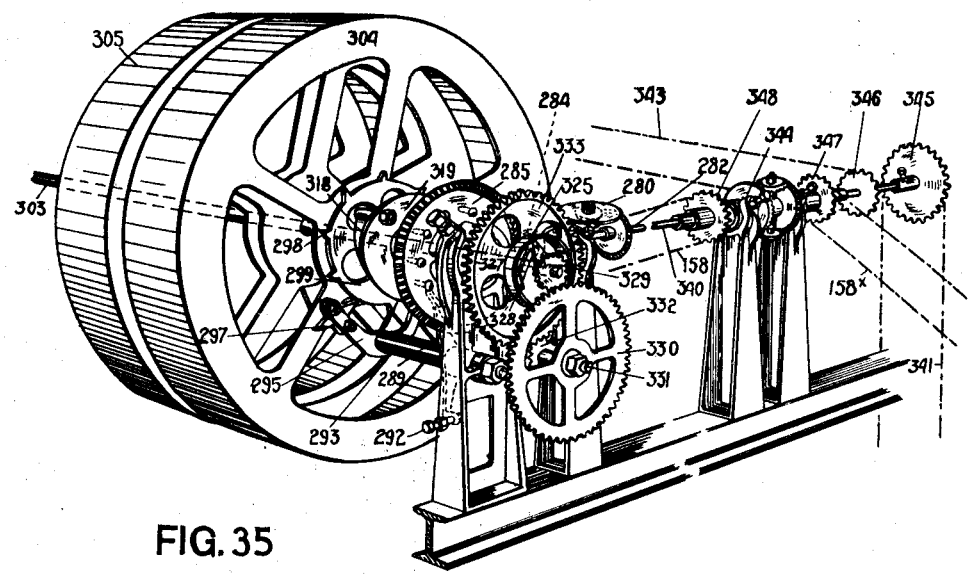

Fig. 35 is a perspective view of portion of the grand total indicator, including the operative mechanism associated therewith, and carried by the grand collector shaft G.

Figure 36:
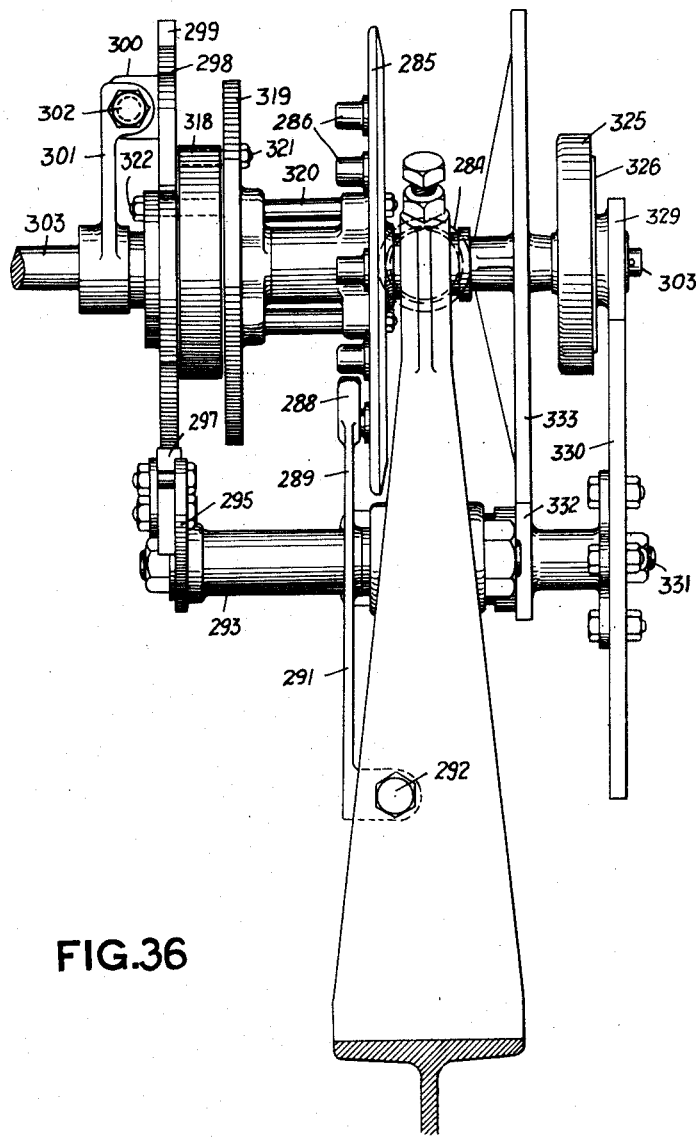

Fig. 36 is an elevational view of the driving mechanism by which motion is transmitted to the tens drum of the indicator from the final collector on shaft G.

Figure 37:
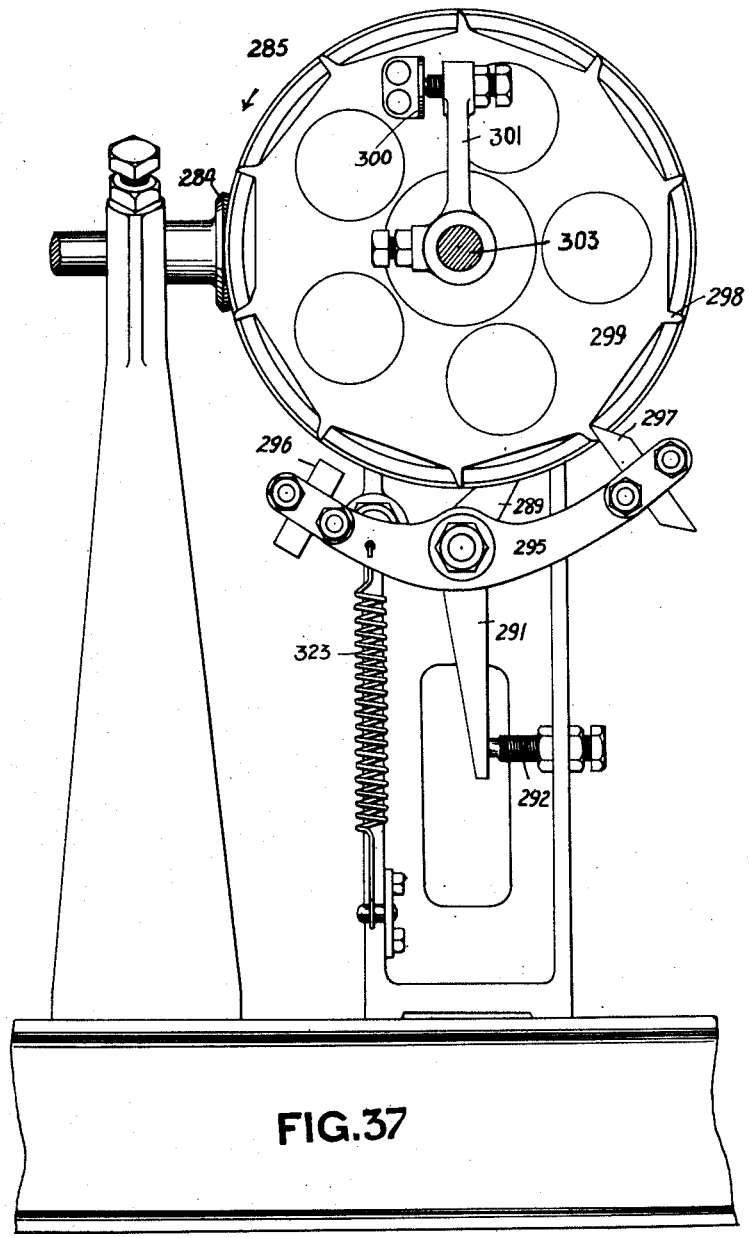

Fig. 37 is an elevational view of the escapement and pallet which govern the advance movements of said tens drum.

Figure 38:
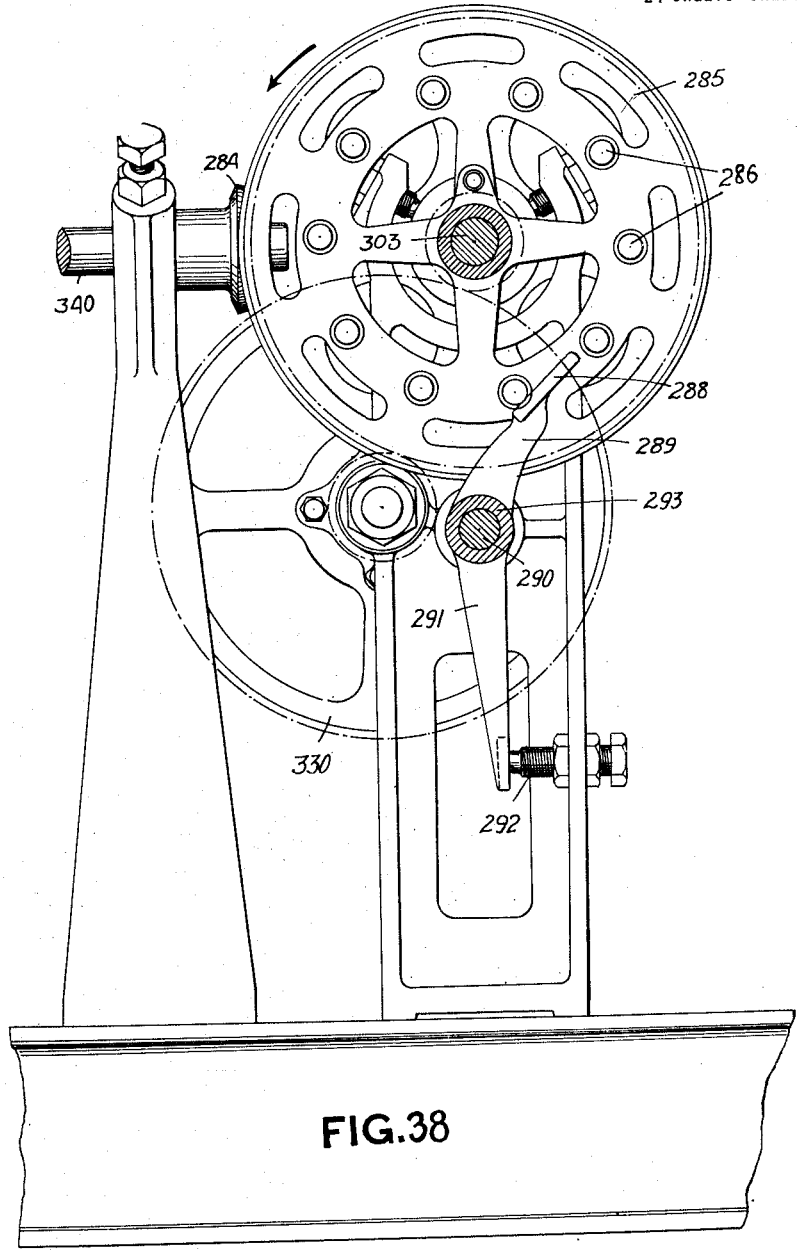

Fig. 38, elevational view of the pin wheel driver in the said mechanism, and parts associated with it.

Figure 39:
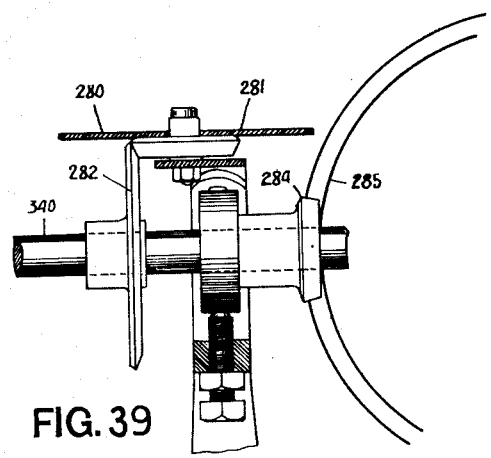

Fig. 39, sectional elevational view of the unit indicator and the gearing by which the dial of same is turned directly by the collector shaft G.

Figure 40:
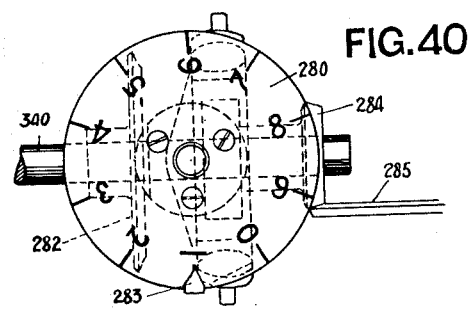

Fig. 40, top plan of same.

Fig. 41, angular perspective view, showing the hundreds, thousands, and tens of thousands drums of the indicator, and certain parts of the decimal progression mechanism, and the zero resetting mechanism.

Fig. 42, opposite perspective view of two of the indicator drums shown in Fig. 41, showing the locking mechanism by which the decimal progression movements are applied successively to the hundreds, thousands and tens of thousands drums respectively from the drum next lower in series.

Fig. 43 is a fragment perspective view showing the locking mechanism by which the movement of a drum is communicated to the drum next higher in series.

Figure 44:
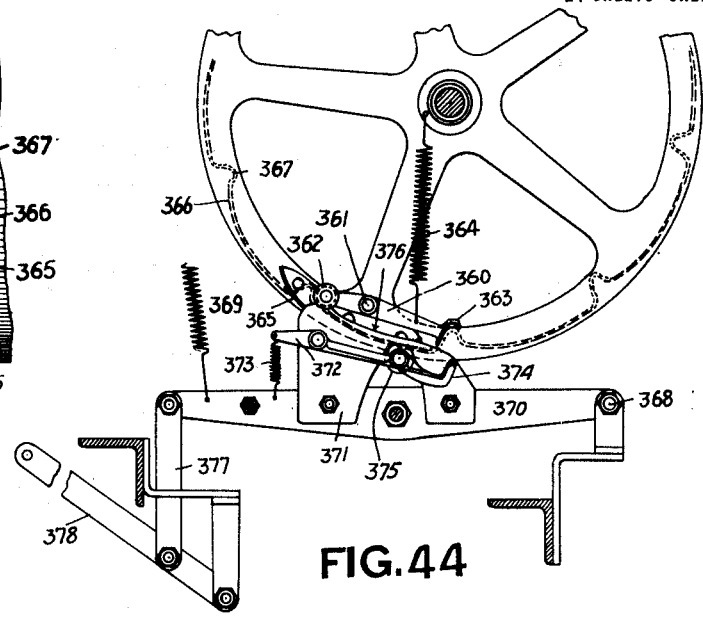

Fig. 44 is a sectional elevational view of the said mechanism.

Figure 45:
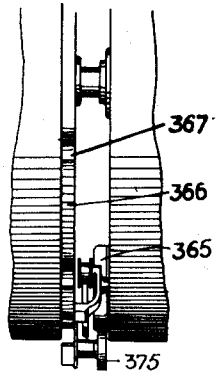

Fig. 45 is a fragment elevation showing said mechanism between two of the drums.

Figure 46:
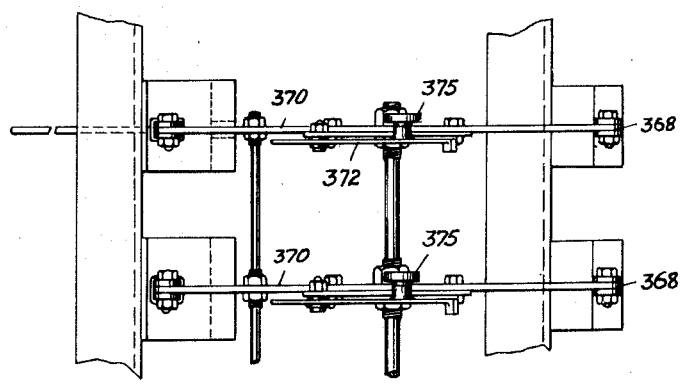

Fig. 46 is a plan view of the lever and cam race mechanism contained in Fig. 44.

Figure 47:
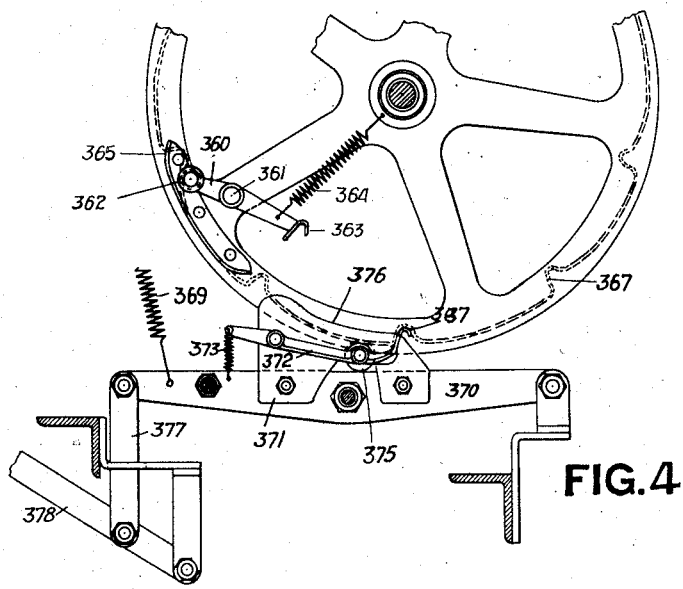

Fig. 47 is a sectional elevational view similar to Fig. 44, but showing the parts in another operative position.

Figure 48:
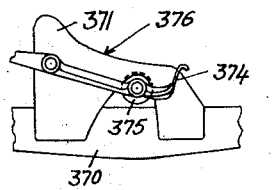
Figure 49:
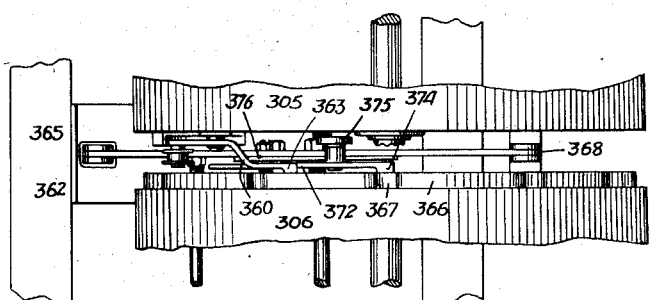

Fig. 48 is a detail view showing the cam race and lock pawl mechanism separate from the drum with which it operates; and Fig. 49 is a top plan of the parts between two of the drums which are shown in elevational view in Figs. 44 and 47.

The drive mechanism shown at A operates the grand totaling and indicating element shown at C, acting on the "unit" dial and "tens" drum only, the drums higher in order being driven from the tens drum by the weight gear J, through the shaft H, while the weight drive shown at B operates a group totaler and indicator shown at D. For convenience of construction the machine is, in practice, built in sections, a certain number of group computers P, with their indicators D, being located in each section. Each one of these group elements is geared to a collector on shaft E, on which the motions of all of the group elements in that section of the machine are totaled, the totality of the movements of the shaft E being transmitted through chain gear F to a final collector on the shaft G, on which the motions from all the sections are totaled and transmitted to the grand total indicator C. The indicators D are arranged in a line, or in two or more parallel lines, the shaft 205 being continuous through each line, and supporting all the indicator drums in such line. The driving shaft H, for the tens, hundreds, thousands, and ten-thousands drums of the grand total indicator C, is positively driven by a weight gear J, which is rewound automatically by chain gear K from the final collector shaft G. The weight driving gears independently maintain the several shafts to which they are respectively fitted in perpetual torsion, and the chain belts L from each of the group totalers P, and chain belts F connecting the summation wheels N of the several sections of the machine to the final collector on the shaft G, transmit permissive motions between these parts. All the motions are directly applied by separate weight gears acting independently on each operative element. The movements of the group indicators D are controlled by the rotational movements of the group computer shafts M, which in turn are permitted to make fractional rotations by means of escapement mechanisms O, which are severally mechanically or electrically operated from separate ticket issuing mechanisms situated at a distant position.

Referring to Figs. 3 to 7, 101 is a shaft extending along the entire length of the machine, and maintained in a continuous rotation by means of an electric motor, or other suitable means. For each driving element A, a crown wheel 102, is mounted on a shaft 103 transversely of the shaft 101, and a weight winding mechanism is operated by said shaft 103. A bevel pinion 104, rotatable on the shaft 101, engages the crown wheel 102. The head of this bevel pinion is fitted with dogs 105, which are engageable with counterpart dogs 106, on a collar 107, feather keyed to the shaft 101. The collar 107 is moved by a rocking fork 108, said fork being keyed to a rocking shaft 109, supported in a bearing 110. A lever arm 111, on the end of which a weight 112 is mounted, is rotatably carried on the shaft 109. The fork 108 is moved to either extreme position by means of the weight 112 on the lever 111 acting on the cradle 114. The lever 111 is thrown over to one side of the shaft to effect disengagement of the dogs 105—106 by moving the fork 108, and to the other side of it to effect their engagement. Check studs 113, in a cradle 114 (which is keyed to the shaft 109), are provided to take the contact of the lever 111, and thereby rock the cradle 114 and partially turn the shaft 109. A rocker 115, having a lever arm 116, is freely mounted on the spindle 109, and pallets 117 projecting laterally from the rocker 115 are engageable with the lever arm 111. The movement of the lever 116 has the effect of lifting the lever 111 until it passes over its center of gravity, whereupon it falls to the opposite extreme position, excessive movement in the release direction being checked by contact of the check arm 147 with the fixed bracket 147×. The upper end of the lever 116 is connected by a link 118 to the leg of a T-lever 120, which has free movement on its fulcrum 121. On one arm of this T-lever is hung a weight 122, and from its other arm depends a rod 123, upon which two collars, 124 and 125, are fixed. The driving weight 126 of the driving gear is fitted with a striker arm 127, through a guide hole in which the pendent rod 123 runs freely. When the weight 126 has fallen nearly to the extreme limit of its downward movement, it presses upon the stop 125 on the rod 123, thereby drawing down said rod and throwing the T-lever about its fulcrum 121; the movement of that lever is communicated by the link 118 to the rock lever 116, causing it to bring one of the offset pallets 117 up against the side of the lever 111, and thereby lift said lever and cause its position to be reversed, thus throwing the dog-gear 105—106 into engagement. Conversely, when the weight gear is being wound up, upon the weight 126 nearing its top position it acts upon the stop 124, thereby raising the rod 123, reversing the position of the T-lever, and through it reversing the position of the lever 111, thereby throwing the dog-gear 105—106 out of engagement. By means of this mechanism automatic rewinding of the weights is effected by a continuous power drive, and it is made unnecessary to provide a long rigging, as would be practically necessary in the case of any manually turned rewinding gear. A few feet fall for the driving weight is all that is necessary, and the weight gear is rewound automatically from the constant motion shaft 101 as often as necessary and without manual attention.

A detent wheel 130, is keyed on the crown wheel shaft 103, and a check pawl 131 is provided to engage this detent wheel and prevent reverse motion of the shaft 103. Upon the shaft 103 is also keyed a sprocket wheel 132. A continuous chain 140, is carried over this sprocket wheel 132, and over an idler wheel 133, to make a fair lead, thence under sheave 134, supporting a counterweight 135, by means of a tug spring 136, thence over a sprocket wheel 137, and thence under the sheave 138, said sheave 138 supporting the driving weight 126 through a tug spring 139. The springs 136 and 139 are provided to ease any irregular motion and prevent jar. The counterweight 135 is provided only for the purpose of taking up the slack of the driving-chain 140, and it is therefore much lighter in weight than the driving weight 126.

144 is a free running roller in axial alinement with the shaft 101. It serves to support the rear side of the large diameter crown wheel 102, and to maintain correct mesh of the toothing of said wheel with the toothing of the pinion 104.

In the skeleton view, Fig. 9, the operation of the weight driving gear will be best seen. The winding direction of the detent 130 is shown by an arrow, and the driving direction of the sprocket 142 is also shown by an arrow. It will be seen that the drive is maintained on the sprocket 142 at all times, even when the chain 140 is in process of rewinding on the sprocket 142.

The sprocket wheel 137 is keyed on a transverse shaft 141, upon which is keyed also another sprocket wheel 142, said wheel 142 being geared by a continuous chain 143 to one of the group computer shafts M. This independent drive is provided for each computer shaft M, there being one such shaft for each group computer. Each of these group computers operates a group indicator. Each of the shafts 141 is also connected by bevel gear 145 to an element of an epicyclic train mounted on a summation shaft E (146). There may be one, two, or any larger number of summation shafts E, depending upon structural convenience and the number of group elements included in one machine; usually there is one shaft E, for each section of the machine. When a small number of group elements only is to be provided for, the summation shaft E is connected directly to the grand total indicator C, in this case taking the place of the shaft G. When, however, there are two or more summation shafts E in the structure, the final movements from each of them are transmitted through gearing N—F to a final grand collector on the shaft G, and the resultant movements are communicated thereby to the grand total indicator C, as hereinafter described in detail.

The rear end of each shaft 141 carries a miter wheel or bevel pinion 145 in permanent mesh with the bevel wheel 151, mounted on the rotor which carries the planet wheels 152, of an epicyclic box on the summation shaft 146 (E). There is an epicyclic box 150—152 carried on the shaft 146 for each shaft 141 operating therewith. The intermediate sun wheels 150 of these epicyclic boxes are connected back to back by means of sleeves 153, or long hubs, these sleeves or hubs being keyed to broken lengths of the shaft 146 to facilitate the erection and dismantling of the epicyclic boxes separately. A movement in any one of the sun wheels 150 is continued through the series to the final wheel 154 on a planet rotor, whence motion is taken off through the bevel wheels 154—155 and the sprocket wheel 157 of the shaft 156 and the chain gear 158 to the grand collector shaft G. The final sun wheels at either end of the series are locked so as to be non-rotatable. When the shaft 141 turns, a corresponding movement occurs in the shafts M and E, with the result that simultaneous computation and indication is effected simultaneously upon the group totaling and indicating mechanism P—D and upon the grand total mechanism G—H—C. For the sake of clearness, Fig. 10 shows only two of the shafts 141 connected up to the epicyclic trains on the shaft line 146, and it will be understood that said shaft line 146 carries upon it one epicylic "box" or element (150—152) for each shaft 141, and that there is a shaft 141 corresponding to each and every group computer and indicator P—D in the machine.

The epicyclic boxes on the shaft E each consist of a pair of opposed sun wheels 150, keyed on separate sleeves 153, and a pair of planet pinions 152 intergearing with the opposed sun wheels and carried on spindles mounted on a rotor freely rotatable on the carrying shaft 146. The transfer gear wheels 151, which intergear with the wheels 145, are mounted on the spindles 156ˣ of the planet wheels. When, therefore, a transfer wheel 151 is rotated, the planet wheels 152 are carried around with it and apply a movement to one of the sun wheels 150, which are fixed on the tubular shafts 153. The shafts 146—153 are interrupted at each epicyclic box, each section carrying the right hand sun wheel of one box and the left hand sun wheel of the next succeeding box in series. An epicyclic train is a known mechanical device, and certain types of it have been used heretofore in a totalizator for the purpose of transferring a multiplicity of drives and accumulating the total rotational result thereof on a final wheel of the epicyclic series.

The group computers P each consist of an intergeared series of epicyclic trains or boxes, one element being provided for each issuing machine, the movements of which are to be registered on the particular group indicator operated by that computer. There is thus one group computer element P for each issuing machine. The detail of the elements is varied, as will be hereinafter described, to enable the compounding of a variety of values in the one computer in such a way that the final movement is proportionate to the aggregate value of the several applied movements, so that, for instance, any certain number of elements or boxes in the series P may be connected to machines issuing tickets each having a value of 10/—each, any number to other machines issuing tickets each having a value of 20/— each, and others connected to machines issuing tickets each having a value of, say, £5. Similarly the detail may be adapted by an alteration in the toothing of the detent wheels of the escapements so that a plurality of different values may be counted up on the one mechanism in such a manner that the rotational movement transmitted to the indicator D is the sum of the values of all the movements applied to the totaler, and not merely the numerical sum of the separate movements thereof. Ordinarily no more than 10 boxes or elements would be mounted on one computer shaft P. If a greater number be necessary, it is desirable to provide the shaft with an intermediate ring bearing to support it and prevent vibration. That, however, is only a mechanical detail which forms no part of the invention, and the fact is mentioned only for the purpose of showing that the number of epicyclic elements in one of these computers is not necessarily limited to a number as small as ten.

Figure 11:
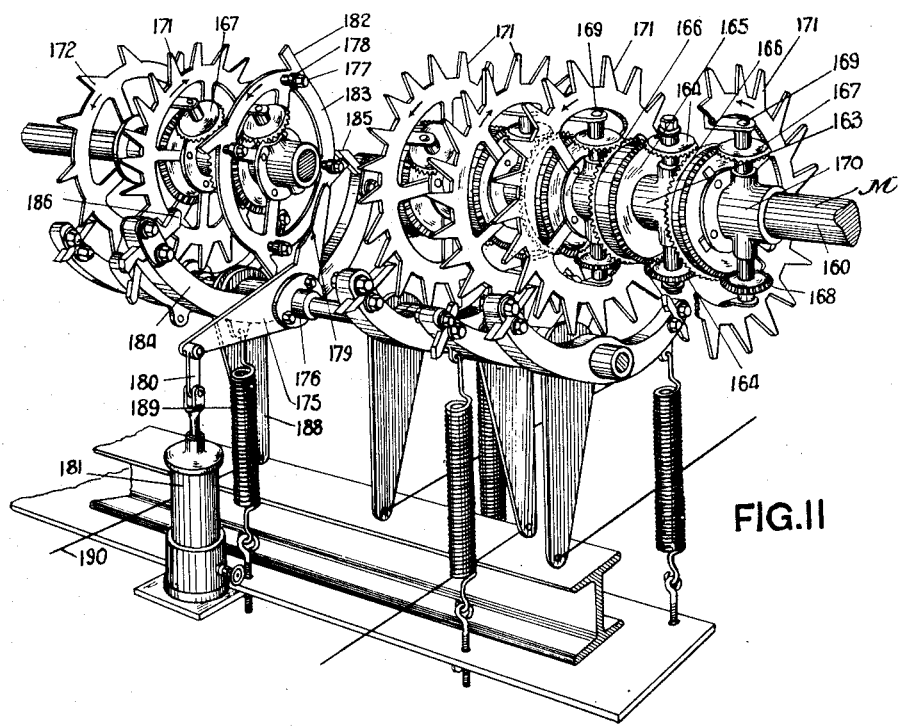
Fig. 11 is a perspective view (parts being broken away for the sake of clearness) of the escapement mechanism and group computer P—O, by means of which the shaft M of each group indicator D is permitted a rotational movement of greater or less extent, depending upon the particular escapement O, which is operated from the issuing mechanism.

The computer mechanism illustrated in Figs. 11 and 12 may be arranged to compute differential values, each of the three orders of pallet movement having then a different value according to which ticket issuing machine its escapements are respectively connected. As shown in these figures, it is, however, designed for computing two values only, certain escapements being each connected to machines issuing tickets of one value, and the others to machines issuing tickets of another value. If a 20-tooth escapement wheel is mounted on the rotor which carries the planet wheels of one element of the epicyclic train, each pallet movement allows that escapement wheel to turn one-twentieth of a revolution, and as the movements of the elements are all ultimately applied to the group computer shaft M through a planet rotor of the train, there is in this case a one-twentieth rotation permitted to that shaft. Similarly, if a 10-tooth escapement wheel were fitted to a planet rotor in the train, each pallet movement would have the effect of permitting the shaft M to turn one-tenth of a rotation. If however, a ten-tooth escapement wheel be mounted on one of the crown wheels of the train, movement of such escapement wheel would be transmitted through the planet wheels to the planet rotors and thence to the shaft instead of directly through the planet rotors in the instances just mentioned, and in this case each pallet movement allowing the escapement wheel to turn one-tenth of a rotation will apply to the shaft one-one-twentieth of a rotation. Owing to the action of the planet gear when one side thereof is advanced and the other not, its center, or its shaft, is advanced only one-half of the driving movement.

By varying the escapement toothings and setting up the pallets to hit and miss correctly with the particular tooth pitch used and mounting the escapement wheels on crowns or planet rotors respectively, each pallet movement permits a degree of shaft rotation corresponding with a certain predetermined value within a more or less wide range. In the construction shown, one of the planet rotors carries a four-tooth escapement wheel. In this case, each of its pallet movements allows said rotor to rotate through a quarter revolution, thereby permitting a quarter turn to the shaft M, and a corresponding angular movement to the group indicator D. The epicyclic train is therefore, by the alteration of the toothing in the escapement wheels and the mounting of those wheels on the sun wheels or on the planet rotors respectively, enabled to compute a totality of values from a more or less wide range of values ascribable to different pallet movements respectively. Thus, for instance, where three orders of toothing are used in a train, a movement of one pallet is made to occur upon the issue of a £1 ticket; a movement of another pallet upon the issue of a £2 ticket; and a movement of a third pallet upon the issue of a £5 ticket; and so on, the consequent movement of the computer shaft M is proportional to the totals of all the values severally ascribable to the several pallet movements controlling it. Each escapement is mechanically or electrically operated from a ticket issuing machine which may be set up at any distant location. The construction by which it is made practicable to compute by means of an epicyclic train on one shaft a plurality of dissimilar values is one of the leading features of the present invention, which distinguishes it from known apparatus of its class in which the several distinct orders of values must be separately computed on separate trains of epicyclic gearing, and the movements of these several trains compounded together in another epicyclic train upon a collecting shaft, through which motion is transmitted to the indicator.

The grand collector carried on the shaft G is a train of epicyclic gears similar to that mounted on the shaft E, all the elements or boxes being structurally identical. The compounding of dissimilar values is effected once for all on the several group computers P, from each of which a movement is transmitted to an element in the train on shaft E, corresponding to the value total of all the dissimilar value movements applied to said compounding computer P; thence the value movements are transferred to and added together by the train on the shaft G.

The epicyclic train P, consists of a plurality of epicyclic boxes, each containing a pair of opposed sun wheels 165—166, and a pair of pinions 167—168, intergeared therewith, these pinions being carried on spindles 169, which are mounted on the planet rotors 170, which carry the escapement wheels. Each sun wheel is made double, that is to say, it has two oppositely presented faces operating respectively in neighboring boxes. On each of the rotors or hubs 170, which carries the planet 167, a detent wheel 171, is mounted so as, however, not to interfere with the free rotation of the planet pinions 167. As already described, however, one or more of these escapement wheels may be fixed on the sun wheel instead of on the planet rotor of a box. As shown in Fig. 12, the two outermost escapement wheels marked 172 and 173 are so mounted. An escapement wheel may be mounted only on a sun wheel located at either end of the train, and not on a sun wheel in an intermediate position therein. When the centering of the escapement teeth is very wide, it is practically necessary to modify the simple construction used in the case of the ordinary 10-tooth or 20-tooth escapement wheel, because the shock on contact with the escapement pallet due to the momentum would cause objectionable vibration and wear and tear. No difficulty is experienced on this account unless the number of teeth in an escapement wheel is substantially less than ten. Whenever the number is small, it is necessary to introduce a brake whereby the otherwise rapid rotational movement of the escapement wheel when released by the pallet is retarded so that the wheel comes to position against the receiving pallet without serious impact. This braking arrangement (see Fig. 11), consists of a rocking lever 175, freely movable about a bearing support 176, and link connected to the piston of a dash pot 181. The face 179 of its curved arm sets in the path of offset pins 177 on the wheel 183, said pins being fitted with free running rollers 178, which act against the curved face 179 when the wheel is rotating, so as to move the lever, and in applying such movement to it to suffer braking retardation with consequent slowing of the wheel's rate of rotation to the necessary extent. The tail of this lever 175 is link connected at 180 to the piston of the air dash pot 181. Upon the release of one of the teeth 182, by the movement of the escapement pallets, the wheel 183 tends to rotate rapidly, but its movement is immediately braked by contact of one of the rollers 178 with the lever face 179, and as the piston rises, the lever moves, allowing the wheel to move slowly and come to rest gently against the intercepting pallet set to receive it. This arrangement is shown in further detail in Figs. 15 and 16, which exhibit clearly the construction of the escapement fork 184 and its detachable pallets 185 and 186. The escapement used in all cases is an escapement of the fork or anchor type, the pallets being inserted in the ends of the fork and secured therein by pins or bolts. In this particular escapement, 184 is the anchor fork, 185 and 186 the pallets, 187 the rocking center, 188 the operating tail lever, 189 a retracting spring acting on one arm of the fork 184 and tending to bring the fork always to the position shown in Fig. 15. The lower end of the tail lever 188 is connected by a flexible wire or line 190 to the issuing mechanism, so that when the issuing mechanism is operated, the lever tail will be moved in the direction indicated by the arrow, causing the anchor fork 184 to rock on the center 187 thereby removing the stop pallet 185 from engagement, and bringing the catch pallet 186 below another tooth of the wheel; upon the return movement, the anchor arm 184 is brought back to the original position by the action of the spring 189, thus retiring the catch pallet 186 and resetting the stop pallet 185 to receive the next tooth 182 of the wheel. The wheel 183 is thus permitted to make one complete tooth movement when the fork is reciprocated, and in making that movement a too rapid motion is prevented by the braking action of the face 179 acting against one of the rollers 178 passing over it.

The structure or operation of the mechanism in which this invention consists does not depend upon the nature of the means by which movement is applied to the escapement forks. That movement may be applied as already described by direct mechanical means from a ticket issuing machine, but it also may be applied electromagnetically as suggested in Fig. 13, which, as drawn, applies to two 20-tooth escapements, but is equally applicable to the 10-tooth or the 4-tooth escapements shown in Fig. 15. In this case 191 and 192 are electromagnets, and 193 and 194 are armatures thereof, link connected to the arms 195 and 196 of the escapement forks.

It will be noted that neighboring escapement wheels always move in opposite directions on account of the alternate direction movement peculiar to the epicyclic mechanism; consequently it is necessary that the escapement toothing and the escapement forks be arranged right hand and left hand respectively, and that the operating movements be applied in a corresponding alternate direction.

The mechanical pawl operating arrangement which has been described with reference to Fig. 15 is indicated in Fig. 14 as applied to neighboring 20-tooth escapement wheels. The shape of catch and stop pallets in each case is adapted to the angular form of the wheel toothing, and it is determined according to existing practice, no claim being made for any particular construction of pallet or tooth profiles.

The group computer shaft 160 is mounted in suitable bearings and on its outer end is keyed a bevel wheel 161 (see Fig. 21) which intergears with the bevel pinion 204. On its other end a sprocket wheel 162 is keyed to it. All the epicyclic boxes on the shaft 160 (M) are freely rotatable on that shaft except the rotor 163, of one of them, which is most conveniently placed at the center of the group and carries the spindles of two planet wheels 164. Any rotational movement applied to the rotor 163 through the rotational movement of the planet wheels 164, or of the crown wheels 165, 166, geared therewith will therefore be transmitted through the shaft 160, at one end to the bevel wheel 161, and at the other end to the sprocket wheel 162. The bevel wheel 161 applies motion to the unit drum 200 of the group indicator D, while the sprocket wheel 162 is geared by chain (L) 143 (Fig. 10) to the sprocket wheel 142 on the shaft 141, and through that shaft applies corresponding rotation of one of the rotors on the shaft 146. The shaft 160 is maintained in perpetual torsion by means of the weight drive applied to it through the sprockets 142—162, but it is restrained from turning by the escapement pallets O, which engage the escapement wheels. When one of these escapement pallets is reciprocated so as to allow the escapement wheel which it engages to turn one tooth, a corresponding movement is permitted the shaft 160, and this corresponding movement occurs also in the shaft 141, and is thence transmitted through the gearing 145—151 to the shaft 146 (E) and the gearing N F to one of the collector gears on the grand total shaft 340 (G).

The group indicator consists of a unit drum 200, tens drum 201, hundreds drum 202, and thousands drum 203. If unnecessary, the thousands drum can be omitted, or, if necessary, a ten-thousands drum may be added by a corresponding reduction or increase of similarly constructed operative parts, as the case may be. The unit drum is driven directly by a pinion 204, which meshes with the crown wheel 161. All the indicator drums are constructed of light sheet metal framing, covered peripherally with paper or calico, and figured as indicated in Fig. 29. They are all freely rotatable on the carrying shaft 205. That shaft may extend for a considerable length, and may support a number of separate group indicators. The unit drum 200 is carried by a hub, on which the bevel pinion 204 is mounted. Said hub also carries a sprocket wheel 206, which is geared by a chain belt 207 to a sprocket wheel 208 in the compensator. The unit drum 200 is therefore turned by the shaft 160. Decimal progression is applied to the tens, hundreds and thousands drums in order by mechanism actuated through the compensator. It is found in practice that the rotational movement of the unit drum 200 is sometimes so very rapid and irregular that it is not practicable to apply decimal movement to the tens drum from it by a pick-up or striker arrangement of any type used in known forms of counter mechanism. The compensator hereinafter described has therefore been devised to so operate as to accumulate the decimal progression movements to be transmitted in successive order to the tens, hundreds, and thousands drums, and to apply those movements to those drums at a uniform rate, and without causing severe impact of parts. The sprocket 208, is fixed on the end of barrel 209, on the surface of which is cut a coarse helical thread 210. 211 is a shaft on which said barrel is rotatable. In addition to the sprocket 208, there is also fixed on the end of the barrel 209 a disk 212, carrying an offset pin 213, upon which is mounted the inner eye of a spiral leaf spring 214. The outer eye of said leaf spring is carried on an offset pin 215, mounted in the side of a spur wheel 216, which is keyed to the shaft 211, and gears with the spur pinion 217, which pinion is rotatable on a fixed arbor 218, and carries a cross head 219, on the ends of which are articulated at 220 a pair of centrifugal action brake arms 221, each fitted with a brake shoe 222. 223 is a fixed brake drum, against the inner surface of which the brake shoes 222 act. A collar 224 is keyed to the shaft 211, and supports two spline rods 225, extending over the full length of the drum 209. The spline rods pass through eyes in a collar nut 226, which is groove-faced and tapped to run on the barrel thread 210. 230 is a floating lever fulcrumed on an adjustable center 231, which is carried by a bracket riding on the frame stay rod 232. The forward end of the lever 230 is fitted with a fork finger 233, which sets in the groove of the collar nut 226. The lever 230 also carries a contact roller 234, which, when the lever 230 is traversed, acts on the curved face of a trip lever 235, which is fulcrumed at 236 on the frame. The outer end of the trip lever 235 acts against the swinging pawls 239 and 240 (see Figs. 18 and 19). These two pawls are hung back by tension springs 149 to an extension of the arbor 218, on which the pinion 217 turns. On the pawls respectively are tappet rollers 243 and 242, located in alinement with the wiper detents 237 and 238, on the disk 212. When the pawls 239 and 240 are in the normally locked position, the detent 237 engages the roller 242, that is when the lever 230 is in the extreme outer position with the contact roller 234 located in the bay 241, of the trip lever 235. When, however, the barrel 209 has been turned by the chain gear 207 so that the collar nut 226 is caused to traverse it and bring the roller 234 over the curved salient face of the lever 235 as in Figs. 21 and 26, said trip lever 235 is pressed backward and caused to force the pawls 239 and 240 outward.

The spur wheel 216 carries an offset finger 244 (see Fig. 18) which is engaged successively by the two pawls 239 and 240 when said wheel rotates. Except when the pawls 239 and 240 are moved outward, they hold the finger 244 and so prevent rotation of the spur wheel 216. At each rotation of the disk 212 the cams 237 and 238 (see Figs. 22, 23, 24) successively engage the rollers 242 and 243, causing the pawls 240 and 239 to be retired successively, and thus allow the finger 244 to pass them and permit the spur wheel 216 to move through one rotation, whereupon, if the pawls are in the inward position, the finger 244 is again tripped and further rotation of the wheel 216 prevented. The spring 214 being always under tension tends to rotate the wheel 216 and the speed at which that wheel, and consequently the shaft 211 to which it is keyed, rotate, is controlled by the brake 222—223, so that too rapid rotation of the wheel 216 and shaft 211 is prevented. When rapid rotational movement is transmitted to the sprocket 208 causing the barrel 209 to turn rapidly, at each turn of the said barrel the cams 237 and 238 free the pawls 239 and 240 momentarily when passing the striker rollers 242, 243, but as the wheel 216 cannot by reason of the brake attachment move so rapidly, its trip finger 244 is tripped from time to time by the pawls 239, 240, and consequently the disk 212 and the barrel 209 can overrun the wheel 216, with the result that the spring 214 is wound up and the collar nut 226 caused to traverse the barrel. Under these circumstances the trip lever 230 is moved by the nut 226, so that the contact roller 234 thereon rides on the salient part of the lever 235, pushing it back and so holding back the pawls 239, 240, with the result that the wheel 216 is left free to be rotated by the wound-up spring 214 and the grooved collar nut 226 is meanwhile traversed backward along the drum 209, because it is turned by means of the spline rods 225, which are revolved around the drum by the rotation of the shaft 211 which turns with the wheel 216. This movement continues until the contact roller 234 drops into the bay 241 of the lever 235, whereupon the pawls 239 and 240 come back to the inward position and intercept any further rotation of the wheel 216 by tripping the finger 244. The excess revolutions of the sprocket 208 are thus, as it were, stored in the spring 214, and the mechanism operates to allow said spring to drive the spur wheel 216, and turn the shaft 211 at a moderate rate of rotation until all the excess rotations of the sprocket 208 have been overtaken by the wheel 216. Consequently though the sprocket 208 may turn at different velocities and at a high rate of speed, depending upon the speed at which the unit drum 200 of the indicator is being rotated, the shaft 211 will always ultimately receive a total number of turns equal to the number of turns imparted to the sprocket 208, but its rate of rotation will be limited by the brake.

On the end of the shaft 211 is keyed a cam 245 which carries an offset crank pin 246. The cam acts on a lever 247 which is keyed to a rock shaft 248 (see Figs. 17 and 30). Upon this rock shaft also are keyed check pawls 249 which engage the notches in flanges 258 of the indicator drums 201, 202, 203, and when closed thereinto prevent accidental rotation of those drums. When the salient portion of the cam 245 acts on the lever 247 the shaft 248 is rocked, with the result that the check pawls 249 are retired as seen in dotted lines Fig. 30, and it is then possible to rotate the indicator drums. The pitman 250 is driven off the crank pin 246 and connected to an arm 251 keyed on a rock shaft 252. Upon this rock shaft, levers 253 are fixed, one for each of the drums 201, 202, 203. To the upper end of each of these arms 253, pull rods 254 are articulated on horizontal pins 255. Light helical springs 256 in tension are connected angularly between the rods 254 and arms 253, and operate to apply slight downward pressure to said rods 254, with the object of keeping the catch pawls and the riding rollers 259 on their outer ends in contact with the indicator drum flanges 258 and 260. The rod 254 which operates to turn the tens drum is fitted with a pawl head 257 which is engageable in the interrupted portions of the flange 258 on the side of the said drum 201, but it is not fitted with a riding roller 259 as are the arms which act on the drums 202 and 203. In Fig. 30 the dotted lines show the forward position of the rod 254 when the pitman 250 is at top stroke. At this top position, the pawl engages a gap in the flange 258 on the tens drum 201 and in the outward motion of the arm 254 as the pitman falls, the drum 201 is moved around one-tenth of a rotation in the direction shown by the arrow to the position shown in the full lines. The shaft 252 is rocked once for every complete turn of the unit drum 200, and it is necessary that the drum 201 shall, for each complete turn of the drum 200, turn one-tenth of a rotation, and, then successively in order, that the drums 202 and 203 shall each make a one-tenth turn for every complete turn of the next preceding drum. The rods 254 associated with the drums 202, 203 are fitted with pawls 257, and they are also each fitted with an offset riding roller 259 which holds those pawls out of engagement with the flange 258 on the drum which it drives, except when the drum next lower in series is performing a movement from "9" to "0." These rollers 259 run on circular flange tracks 260 on the side of the next lower drum in series, and said flange tracks 260 are so located as to hold the pawls 257 clear of the notched flange 258 on the next higher drum. At one point, however, the flange track 260 on the tens drum 201 is joggled inward as shown at 261, Fig. 32, and the corresponding flange track 260 on the hundreds drum 202 is formed with an inward joggle of somewhat different form as shown in Fig. 33. If a ten-thousands drum is fitted, the flange track 260 on the thousands drum 203 is also formed as shown in Fig. 33. When the riding roller 259 drops into the joggled portion 261 of the flange track 260 on the tens drum its pawl 257 drops into a gap in the interrupted flange 258 of the hundreds drum and engages it in the same manner as indicated in Fig. 32, so that the hundreds drum is by the reciprocation of the rod 254 moved forward one-tenth of a rotation. This pick-up action occurs once in each complete rotation of the tens, hundreds and thousands drums, which respectively carry the flange tracks by which the pick-up for the next higher drum in series is controlled. A difficulty is met in the working of this control unless provision is made for preventing engagement of the pawl which moves the thousands drum except while the hundreds drum is turning from "9" to "0" and similarly for preventing the engagement of the pawl which moves the ten-thousands drum except while the thousands drum is turning from "9" to "0." In the absence of such provision, the thousands drum would be advanced a figure when the total passes 909, but it is only required to be so advanced when the total passes 999. The units drum is driven from an outside source; the remainder of the drums are driven through reciprocating rods actuated from this source once for every tenth unit registration. Accordingly the tens drum may be advanced with regularity one step for every movement of the rods without other means of intercontrol between these drums. The tens drum then may serve as a control drum for the rod actuating the one-hundredths drum by merely providing the notch 261 and no difficulty is encountered, because coincident with each actuation of the one-hundreths drum the tens drum is also necessarily moving from "9" to "0"; but when the one-hundreths drum is moved to "9" it presents its joggle to the coacting roller 259 on the rod actuating the one-thousandths drum, and the next actuation of these rods tends to move the one-thousandths drum, which actuation occurs at the next registration of ten units; that is as the total passes 909. To overcome this, it is necessary to cause the one-thousandths drum to be actuated only when the one-hundreths drum is in the course of its tenth movement, that is, from "9" to "0" instead of at the first actuation of the rods after the one-hundreths drum is moved to "9." The difference in the form of the joggles 261 is made to provide for effective operation in view of this difficulty, and the shorter joggle operates to make the roller kick up and lift the pawl out of engagement with the next higher drum, and therefore omit to move such drum, if the drum on which the roller runs (the "control" drum) is not moving forward at the moment when the roller has dropped into the joggle in said control drum. If however the control drum be in motion when the roller engages the joggle in its flange, the roller will not be kicked up and will permit the pawl to stay engaged with the higher drum and apply a one-tenth advance rotation to it while the control drum is simultaneously advancing one-tenth of a rotation. Owing to the action of the brake 222—223, the reciprocating movement of the gang of pull rods 254 is regular and slow, and a relatively slow advance movement is therefore imparted to the drums 201, 202, 203, with the result that momentum difficulties are avoided, and the parts come to rest without objectionable shock.

A flat leaf spring 263 is fitted for each of the drums 201, 202, 203. These leaf springs are fitted with button heads 264 which snap into the notches in the flanges 258 and so serve to "center" the drums correctly and hold them against accidental movement, but not so as to prevent the pawls 257 from applying motion to them when the shaft 252 is rocked.

Figure 1:
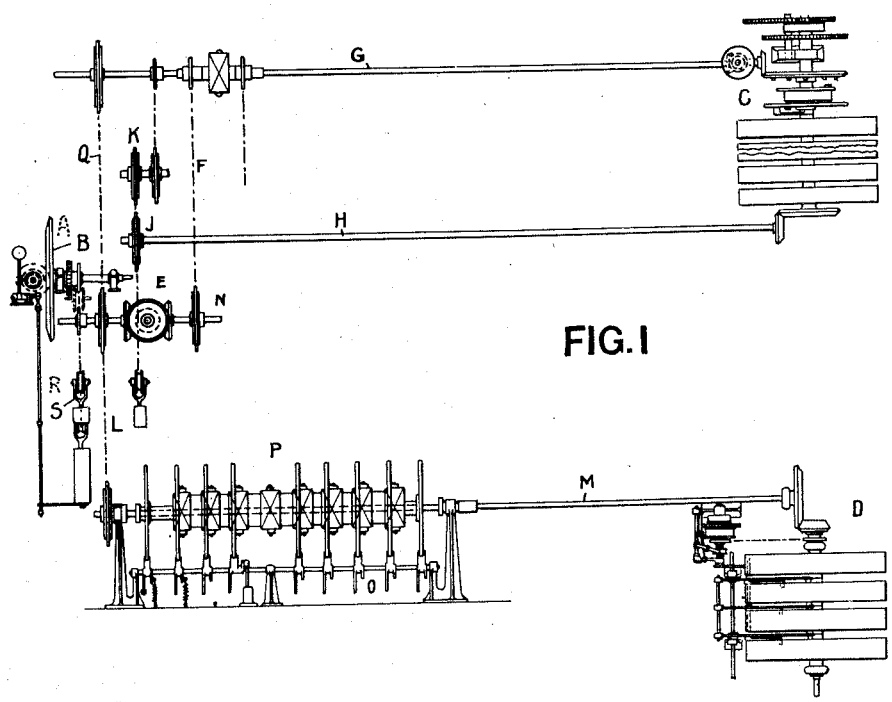
Figure 2:
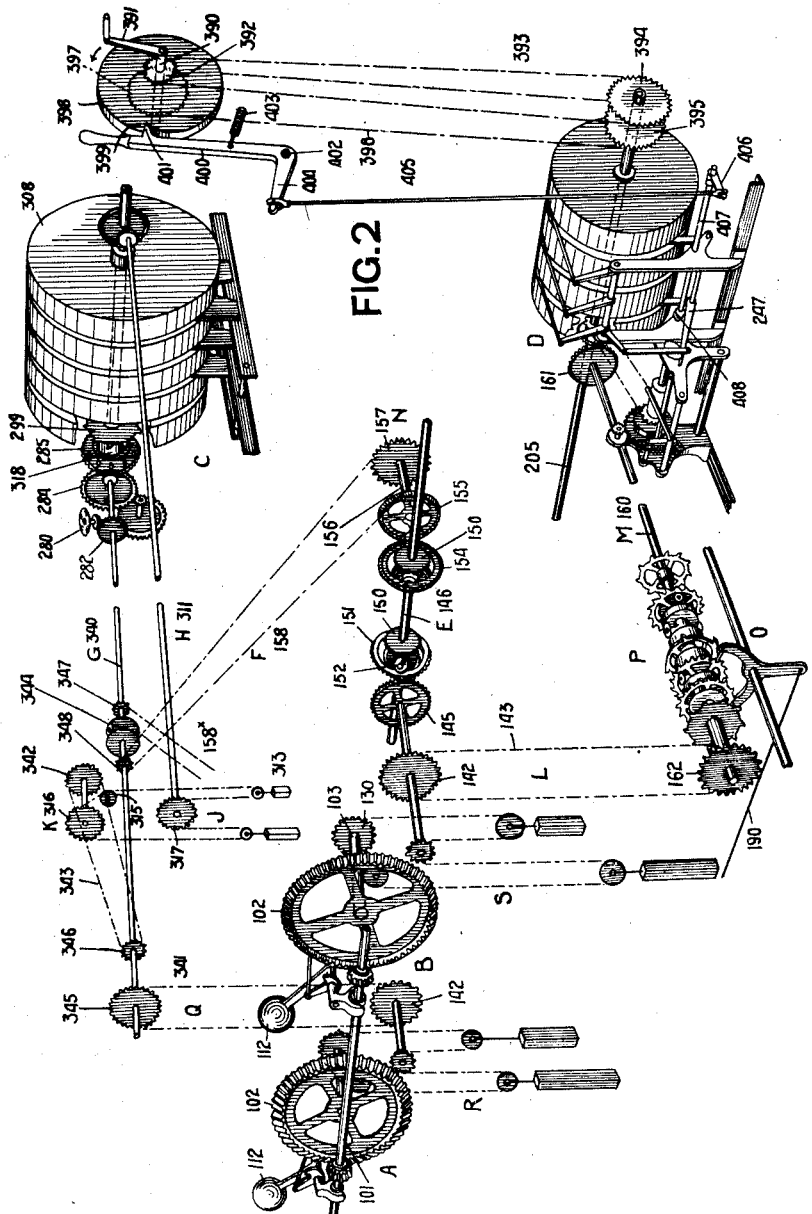
Figure 3:
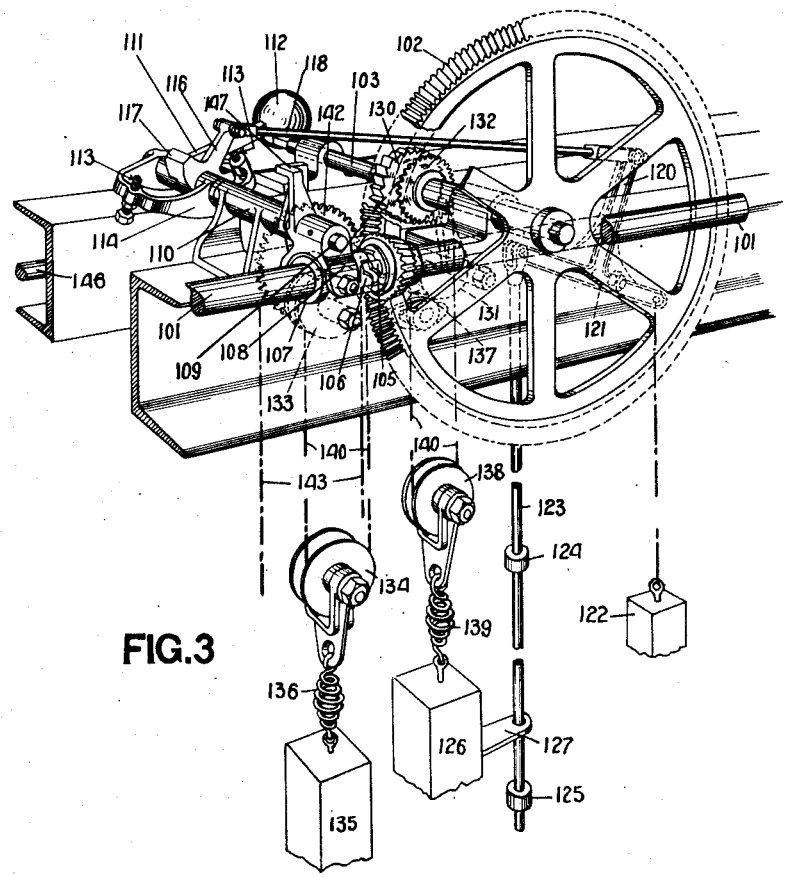
Fig. 3, are clutched up to a permanently rotating mechanical drive, whereby the weights are automatically "rewound" periodically.
Figure 4:
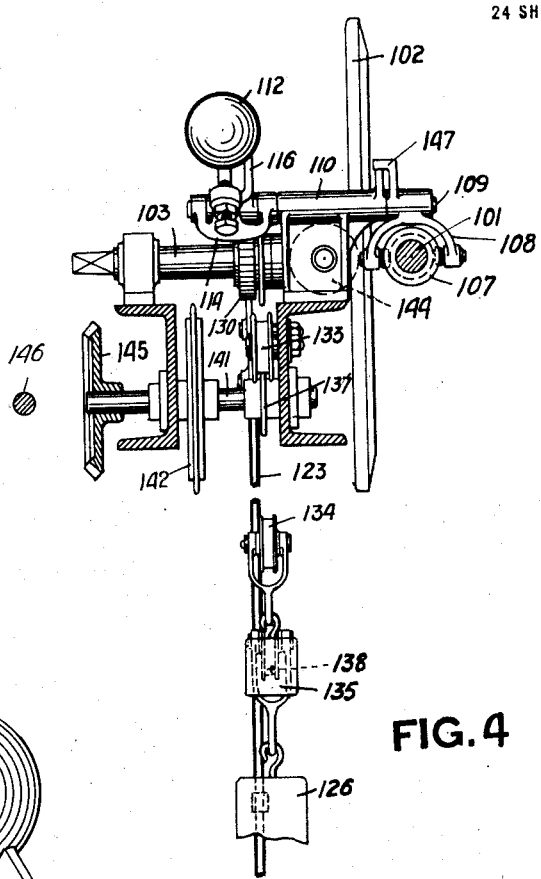
Fig. 4 is a sectional end elevation of a weight driving gear.
Figure 5:
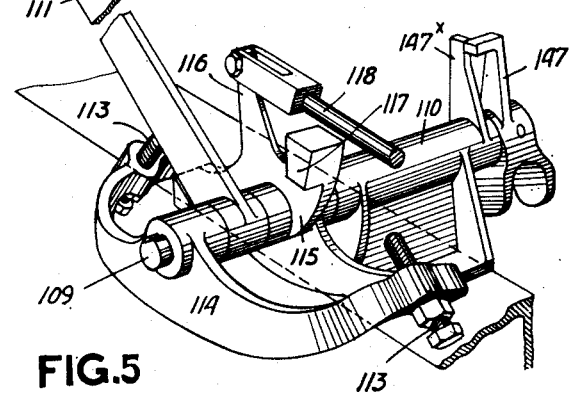
Fig. 5 is a perspective view of automatic clutching and de-clutching mechanism by means of which the rewinding pulleys of the weight driving gear.
Figure 6:
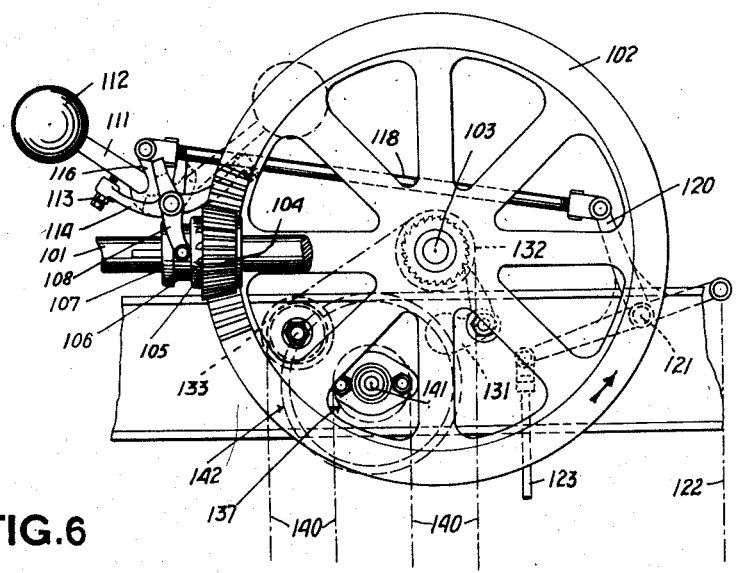
Fig. 6 is an elevational view, and Fig. 7 a top plan of the rewinding gear and automatic clutching and de-clutching mechanism shown in Figs. 3 and 4.
Figure 7:
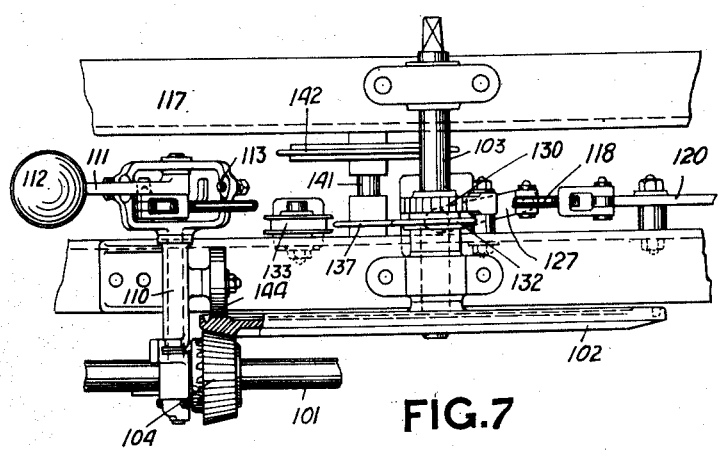

For the purpose of resetting the drums of the various group indicators to "0" rapidly, a mechanism is provided for retiring all the check pawls 249 simultaneously and then turning all the drums indicating a figure above zero until all of them indicate "0." These means are shown in Fig. 2, certain of the mechanical parts associated with this resetting gear being shown also in Figs. 17, 29, 30, 31, and 34.

Located at a convenient position in proximity to the grand total indicator C is a shaft 390 rotatable in suitable bearings by means of a hand crank 391. Upon the shaft 390 is mounted for each separate shaft 205 a sprocket wheel 392 which is geared "one-to-two" by a chain belt 393 to a sprocket wheel 394 keyed on the shaft 205. There is also keyed on said shaft 205 a second sprocket 395 of the same diameter as the sprocket 394 and geared "one-to-one" by a chain belt 396 to a sprocket 397 fixed on the side of the lock disk 398. This lock disk 398 and the sprocket 397 are freely rotatable on the shaft 390. The lock disk 398 has cut in its periphery a catch tooth 399. A hand lever 400 with pawl tooth 401 which is engageable with the catch tooth 399 is mounted on a fixed fulcrum 402 and is normally held up against the periphery of the lock disk 398 by means of a tension spring 403. A tail crank 404 on the lever 400 is connected by a link 405 to a lever 406 on the latch shaft 407. Said latch shaft is armed with a cam 408 which contacts with the lever 247. In each section of the machine all the group indicator drums D are mounted on one shaft 205 or on two or more such shafts and consequently all the drums in that section can be turned simultaneously by turning the shaft 205 so as to engage certain mechanism thereon with the drums.

To effect drum resetting, the lever 400 is withdrawn manually to release the pawl 401 from the tooth 399, and the disk 398 is then rotated in the direction indicated by the arrow. But in order to bring the disk and consequently the indicator drums around to the stop ("0") position as shown in Fig. 2, it is necessary to make two complete rotations of the hand crank 391. In this movement the shaft 205 is turned through 360°.

The shaft 205 has keyed upon it next to each indicator drum a flange 410 formed with a recess 411 which acts as a catch. Upon the side of each drum is hung a pawl arm 412 in alinement with the shaft flange 410 and having an offset pawl 413 engageable with the recess 411. This pawl arm 412 is normally held by the light spring 414 so that the pawl 413 runs freely over the periphery of the flange 410 in the step-by-step forward movement of the drums. When, however, the shaft 205 is rotated, the recess 411 picks up the pawl 413 and carries around the drum until the rotation of the shaft 205 ceases.

The centering of the indicator figures on the drums is so arranged that in the stop position of the shaft 205, corresponding with the lock position of the lever tooth 401 and lock disk 398, all the displayed figures will read at "0". The step-by-step advance pawl and riding roller 257—259 will in this resetting motion run freely over the drum flanges 258 and 261. The centering latch 263 will not oppose any substantial resistance to the rotation of the drums, and the check latch 249 will, as previously explained, be withdrawn upon the operation of the hand crank 391, which turns the cam 408 so as to depress the lever arm 247 and rock the shaft on which said latch 249 is mounted.

When the machine contains, as it usually would do, a considerable number of group computers P, some or all of which may be in operation simultaneously, the totality of rotational movements transmitted to the grand total indicator within unit time is such that a very rapid rotation of the shaft G (340) frequently occurs, and when the operation of all the totalers is stopped simultaneously, the shaft G is suddenly brought to rest. As the grand indicator drums must be of considerable diameter in order that the figures on them may be read from a distant position, it is found impracticable to apply the sudden and irregular starting and stopping movement of the shaft G to the grand total unit drum owing to inertia and momentum difficulties; the drum structure and the operative parts connected with it would need to be built so stoutly to withstand the shock so sustained that very powerful drive mechanism would be required to move them, and it is impracticable to use such mechanism. In any event, the shock of impact upon sudden arrest of motion of the drum would necessarily involve a great risk of fracturing some of the parts.

It is found in practice in the operation of these machines that even if the unit drum of the grand total indicator were directly operated by the automatic mechanism, the figuring on that drum when it is rotating at a fast rate while issues are being registered could not be distinguished, and that consequently that drum is of no practical use for indicating purposes while the machine is actually operating. In this present machine this practical difficulty is met by not driving the unit drum by the automatic mechanism, but allowing it to stand idle at "0" on the shaft of the indicator, a unit dial having a negligible weight being, however, turned by the shaft G. When the machine is brought to rest the unit drum of the grand total indicator is moved manually to display the figure indicated on the small dial, and distant observers may then read the full grand total. As an attendant must be employed to operate the mechanism for resetting the indicators, this setting of the grand total unit drum may be effected without any delay and consequent inconvenience to persons interested in observing the full grand total, as same can be displayed a few seconds after the automatic operation of the machine has been arrested. 280 is the grand total unit dial. It is mounted on top of a bevel pinion 281 which gears with a bevel crown 282 keyed on the shaft G. 283 is a fixed pointer which directs the attendant to the digit on the dial 280 representing the indicated unit of the grand total.

A bevel pinion 284 on the end of the shaft G gears into a bevel crown wheel 285, having on the back of it ten projecting studs 286. In the rotational path of these studs is located a tappet end 288 on a lever 289, which lever is pivotally mounted at 290 on the frame. The tail 291 of this lever is provided with a screw stud stop 292 by which the inward movement of the tappet 288 is limited and set and a spring 323 operates to hold it normally against said stop 292. The hub 293 of the lever 289 carries the escapement fork 295 which is fitted with detachable pallets 296 and 297. These pallets coact with detent teeth 298 on a wheel 299.

Upon the wheel 299 is a lug 300 through which rotary motion is applied to said wheel by an arm 301 fitted with an adjustable contact head 302. The arm 301 is pinned or keyed to the shaft 303 on which the several drums other than the tens drum are rotably mounted, said tens drum being keyed to it, and the outer end of this shaft beyond the highest drum of the series carries a bevel crown wheel 309 (Fig. 8) into which gears a bevel pinion 310 keyed on the end of the way-gear driving shaft 311. This is the shaft H, which is driven by the weight gear J shown in Fig. 2. The weight gear comprises a driving weight 312, tension weight 313, continuous chain belt 314, fair lead pulley 315, winding sprocket 316, and a driving sprocket 317. This winding gear is shown in semi-diagrammatic form in Fig. 9, which has been already described as illustrative of the construction used in connection with the weight driving gears R and S. All the weight driving gears are constructed on the same principle, and are automatically rewound, this particular gear J being rewound continuously by its connection through the gear K to the shaft G which is turned by the weight gear R. It will be observed, therefore, that the shaft 303 is under constant torsion tending to rotate the wheel 299, and said wheel rotates tooth by tooth as the escapement fork 295 rocks in obedience to the movement imparted to it by the tappet lever 289. A spiral leaf spring 318 forms a connection between the wheel 299 and a disk 319 which is fixed to the wheel 285 by means of studs 320 or otherwise, and is in effect integral with said wheel. The outer eye of the spring 318 is carried on an offset pin 321 on the disk 319, and its inner eye is carried on a pin 322 offset on the wheel 299. The disk 319 rotates with the wheel 285 in obedience to the movements imparted by the bevel pinion 284. These movements may be rapid.

The wheels 285 and 319 and detent wheel 299 are free to rotate on the shaft 303, their connection to that shaft being through the lug 300 and tappet arm 301. The spring 318 forms a resilient connection between the disk 319 and the detent wheel 299. The speed at which the shaft 303 may rotate is governed by the brake gear shown in Figs. 35 and 36. This brake gear comprises a brake drum 325 keyed to the shaft 303 and a rotating head 326 carrying arms 327 articulated to it and armed with brake shoes 328 which when revolved rapidly act by centrifugal force on the interior surface of the drum 325. The pinion 329 by which the brake arms 327 are rotated runs freely on the shaft 303, and this pinion is driven by the spur wheel 330. Said spur wheel is rotatably mounted on a fixed arbor 331, and carries a spur pinion 332, which gears with the spur wheel 333 which is keyed to the shaft 303. Any rotational movement of the shaft 303 is transmitted to the brake arms 327 through the wheel train 333—332—330—329. The centrifugal action of the brake increases with the speed of the shaft and the brake is weighted and set, having regard to its relative speed, so that it operates to limit the rate of rotation of the shaft 303 sufficiently to obviate mechanical injury to the tens drum of the indicator.

The spring 318 is always under some tension, and tends to turn the ten-tooth escapement wheel 299, which advances one tooth at each reciprocation of the escapement fork 295. When the wheel 285 turns at a faster rate than the brake permits the shaft 303 to be turned, the lug 300 on the wheel 299 moves ahead of the stop 302, and the shaft 303 then continues to rotate at a speed limited by the brake action until said stop 302 comes against the lug 300, whereupon the rotary motion of the shaft 303 and the tens drum ceases. The tens drum is therefore not rotated at the same speed as the wheel 285, though it always ultimately makes the same number of turns as that wheel. The gear wheels 281, 282, 284 and 285 are proportioned in diameter so that the wheel 299 advances one tooth for each complete rotation of the dial 280.

The decimal progression from the tens drum 305 to the hundreds drum 306 and thence to the thousands drum 307 and thence to the ten thousands drum 308 is effected by means of decimal progression gear of a type which has been used already in apparatus of this description. This decimal progression gear is shown in Figs. 42 to 49 of the accompanying drawings and includes means for the resetting of all the drums in the grand total indicator C simultaneously. Similar decimal progression mechanism is used between the tens drum and the hundreds drum, the hundreds drum and the thousands drum, and the thousands drum and the ten thousands drum respectively, this mechanism operating in each case to lock the neighboring drums so that the movement of the drum lower in the series is communicated onward at the proper interval for altering the numeration on the drum higher in the series. The interlocking mechanism in each case comprises an automatic lock on the lower drum, a detented flange on the upper drum, and cam race and locking pawl carried on a retirable frame independent of the drums. The lock on the lower drum engages a detent on the flange of the upper drum once in each revolution of the lower drum, and simultaneously the locking pawl on the frame is released; thereupon the two drums move together through an arc of 36°, whereupon the locking pawl is replaced and the drum connections disengaged, the upper drum being thus fixed in its new position while the lower drum is left free therefrom to be rotated step by step by the preceding mechanism controlling it.

Figs. 41 and 42 may be read together, Fig. 42 representing the units and tens drums broken away from the hundreds, thousands, and ten thousands drums (shown in Fig. 41) so as to expose the interlocking mechanism. On the tens drum 305 is mounted a rocking arm 360 upon a through rod 361. The rear end of this rocking arm carries a tappet roller 362 and its forward end is formed as a claw 363. This forward end is held normally retired by a tension spring 364. Upon the side of the drum is a short flange 365. The opposed face of the hundreds drum is armed with a flange 366 in which ten detents 367 are formed at equal peripheral distances apart. The lock jaw 363 is engageable with these detents 367.

Upon the machine frame, below the indicator drums, is a rock frame pivotally movable in a vertical plane about centers 368 and normally held in the upward position by a tension spring 369. This frame comprises an arm 370 for each space intervening between the tens and ten thousands drums. Each of these arms 370 has mounted upon it a cam race 371. Upon the side of the plate forming the cam race, a rocking pawl 372 is pivotally mounted, and a tension spring 373 is fitted to the tail of this pawl to keep its tooth 374 normally engaged in one of the flange detents 367. 375 is a tappet roller carried on a pin offset from the side of the pawl 372 and projecting through a space cut in the lower part of the race plate 371. The face 376 of the cam is in alinement with the roller 362, and the roller 375 is in alinement with the wiper flange 365. In the idle position, that is to say when a lower drum is not locked to its neighboring higher drums, the higher drum is held fixed by the pawl 374 as shown clearly in Fig. 41. Upon the drum 305 attaining the zero, or change over, position at which the drum 306 is required to be moved ahead one tooth, the pawl 374 is first retired by the downward pressure of the flange 365 upon the offset roller 375. Immediately thereafter the tipping of the lever 360 in consequence of the lifting of the tappet roller 362 at its rear end in running over the cam face 376 causes the lock claw 363 to engage one of the detents 367, and to hold it engaged therewith so as to carry around the drum 306 with the drum 305 until the lever 360 is released by its tappet roller 362 over-running the end of the cam 371 simultaneously with which motion the lock pawl 374 is restored when its tappet roller 375 is no longer engaged by the flange 365. In this way the hundreds drum is engaged by the tens drum, the thousands drum by the hundreds drum, and the ten thousands drum by the thousands drum at appropriate times and the several drums are moved in correct decimal progression. The bars 370 are fixed together in a gang forming a rock frame as shown clearly in Fig. 41, and this frame is connected by a link 377 to a hand lever 378. By pulling down this hand lever the frame 370 is moved downward bodily against the tension of the spring 369, with the result that the pawls 374 are disengaged and all the drums left free. In each drum a restoring weight is fixed in a certain peripheral position so that when the drums are freed to rotate on the spindle which carries them they will turn by gravity to a certain position in which this counter-weight attaining its lowermost place brings the zero figure to the observation point. It will therefore be seen that by the single manual motion of pulling down the lever 378, the hundreds, thousands and ten thousands drums in the grand total indicator are freed from mechanical control and are permitted to come back by gravity to the zero or reset position. The unit drum is set and reset at zero manually, as already described, and the tens drum is brought to zero by actuating one of the counter escapements the necessary number of units to apply the required degree of rotation thereto.

What I claim as my invention and desire to secure by Letters Patent is:—

1. A totalizator comprising a constantly rotating primary power shaft, a plurality of group computers and indicators located in each separate section of the machine, a train of epicyclic gears on a collector shaft in each such section of the machine, gearing between each group computer and an element of the collector train in the section in which such computer is located, a weight driving gear associated with each of said computers, and an automatic clutch between a primary power shaft which is maintained permanently in rotation and each said weight driving gear, a grand total collector consisting of a train of epicyclic gears the elements of which are respectively geared to the final members of said section collector gear trains, weight driving gears acting on said grand total collector, an automatic clutch between said grand total collector and said primary power shaft, and a grand total indicator geared to the grand total collector.

2. A grand total indicator for a totalizator, comprising a grand total collector, indicator drums of units, tens and of higher order on a shaft, and having in combination means for maintaining said shaft under constant torsion, means for controlling its maximum speed of rotation, means for permitting the rotation of said shaft in correspondence with the final movements of the grand total collector, a connection between said shaft and said tens drum, decimal progression mechanism between said tens drum and each of the higher drums in serial order, a unit drum manually rotatable on said shaft independently of the drums higher in series and an indicator dial geared to the collector to indicate unit totals.

3. In a totalizator containing a plurality of group computers and indicators, a grand total collector and indicator intergeared with said group computers and indicators, and independent weight drives acting respectively on the several group computers and indicators and on the grand total collector and indicator,—a main driving shaft, means for maintaining the same in constant rotation, gearings located between said shaft, rewinding pulleys in connection with the several weight drives, and automatic clutches and clutch tripping mechanisms associated with each of said weight drives.

4. In a totalizer mechanism, the combination of a series of indicator drums, a train of epicyclic gears, a shaft on which said train is rotatable, one element of the train being fixed to said shaft, each of the elements of the epicyclic gears except said fixed element having a toothed escapement wheel with the teeth spaced proportionately to different money values, means adapted to actuate the escapement wheels consequent upon the operation of ticket issuing mechanism, driving mechanism for maintaining said shaft in constant torsion, and a connection from said shaft to the indicator drums.

5. In a computing mechanism, the combination with a computor comprising a series of indicator drums, and means for transmitting to said computor movements corresponding to the total value of movements of a plurality of different individual values, of an epicyclic train, in said transmitting means, an escapement wheel on each element of the train save one, a shaft on which said elements are rotatable except the one not provided with an escapement wheel, said element being fixed to the shaft, said escapement wheels being adapted to advance different amounts at each actuation, and a driving means on said shaft subjecting it to constant torsion.

6. In a totalizer, the combination with a decimal progression indicator, of a shaft for transmitting motion thereto, an epicyclic train on said shaft, a toothed escapement wheel on each element of said train except one, means for fixing said one element to the shaft, a driving means for maintaining constant torsion on the shaft, said escapement wheels having a different tooth pitch, means for actuating the escapement wheels and adapted to be operated by ticket issuing mechanism, and means for controlling the speed of one of the escapement wheels having a large tooth pitch and a corresponding amount of movement at each actuation.

7. In a device of the character described the combination with a total computer, of means for transmitting movement thereto, corresponding to the total of the number of movements of actuating devices, said means comprising a plurality of escapement wheels, an epicyclic train having elements carrying said wheels and connected with and adapted to drive the shaft on which the wheels are mounted, said escapement wheels adapted to be advanced different distances upon each actuation, a yielding member adapted to engage the escapement wheel advanced the greater distance upon each actuation to govern the speed of its movement, and constant torsion driving means applied to said shaft.

8. In a device of the character described the combination with a registering device adapted to compute the totals by decimal progression, of an epicyclic train, a single shaft on which that train is mounted, each element of the train except one being rotatable and having thereon a toothed escapement member, said one element being attached to the shaft, driving means applying constant torsion to the shaft, said escapement members having different tooth pitch, escapement devices controlling said members and adapted to be actuated from ticket issuing means, projections on the escapement member having the lesser number of teeth and yielding means engaging said projections to retard the movement of said escapement wheels.

9. In a device of the character described, the combination with a computing mechanism and means for transmitting motion from series of ticket issuing mechanisms to said computing mechanism, of an epicyclic gear box in the transmitting means, an escapement wheel on said box, an escapement dog controlling the rotation of the wheel, constant torsion driving means acting on said wheel, lateral projections on said wheel, a movable arm in the path of the projections, and yielding means permitting said arm to be moved consequent upon the rotation of the wheel while controlling the speed of the movement of said wheel.

10. In a totalizer of the type described, which is constructed in sections, each containing a plurality of group computers and indicators and a grand total collector connected with each of the computers and indicators, the combination of an intermediate collector for each section comprising a train of epicyclic gears, gearing therefrom to each element of said section collector and the grand total collector, an epicyclic train for the grand total collector, each element of which is geared to one of the section collectors, independent constant torsion drives applied to each group computer and indicator and to the grand total collector and indicator, constant motion driving means, and means connected therewith for intermittently storing energy in the several independent drives.

11. In a totalizer having a grand total indicator, a plurality of sections each having a plurality of group indicators and means for transmitting motion from the several indicators to the grand total indicator, tens and higher orders of drums, a shaft on which said drums are mounted, a second shaft, gearing for transmitting motion therefrom to the tens drum, a spring compensating transmitting member in said gearing, a unit indicator geared directly from said drum, the units drum being loose upon said indicator shaft, decimal progression mechanism from the tens drum to the higher orders, said unit drum being adapted to be set manually to correspond to said dial and an epicyclic train driving said second named shaft, the elements of said train being adapted to be actuated from different sections of the totalizer.

12. In a totalizer the combination with a grand total indicator and a series of group total indicators operatively connected with the grand total indicator, of a primary registering device in such operative connections comprising a shaft geared at one end to the grand total indicator and having its other end geared to mechanism leading to the grand total indicator, said shaft having thereon an epicyclic gear element rigid therewith and a plurality of epicyclic gear elements connected in a train with the first mentioned element, an escapement device on each element except the first mentioned element, means for permitting these elements to move different distances consequent upon an actuation, and means for applying constant torsion to said shaft.

In testimony whereof I have affixed my signature in presence of two witnesses.

GEORGE ALFRED JULIUS.

Witnesses:
W. J. DAVIS,
W. KEARIN.